United States Patent
Volkerink et al.

(10) Patent No.: US 12,124,991 B2
(45) Date of Patent: Oct. 22, 2024

(54) HANDHELD TAPE NODE DISPENSER AND METHOD

(71) Applicant: Trackonomy Systems, Inc., San Jose, CA (US)

(72) Inventors: Hendrik J Volkerink, Palo Alto, CA (US); Ajay Khoche, West San Jose, CA (US)

(*) Notice: Subject to any disclaimer, the term of this patent is extended or adjusted under 35 U.S.C. 154(b) by 153 days.

(21) Appl. No.: 17/207,506

(22) Filed: Mar. 19, 2021

(65) Prior Publication Data

US 2021/0295247 A1 Sep. 23, 2021

Related U.S. Application Data

(60) Provisional application No. 62/992,091, filed on Mar. 19, 2020.

(51) Int. Cl.

| | |
|---|---|
| G06Q 10/087 | (2023.01) |
| B65H 35/00 | (2006.01) |
| G06K 19/077 | (2006.01) |
| H04W 4/029 | (2018.01) |
| H04W 4/80 | (2018.01) |

(52) U.S. Cl.
CPC ....... *G06Q 10/087* (2013.01); *B65H 35/0033* (2013.01); *G06K 19/0776* (2013.01); *H04W 4/029* (2018.02); *H04W 4/80* (2018.02); *B65H 2701/377* (2013.01)

(58) Field of Classification Search
None
See application file for complete search history.

(56) References Cited

U.S. PATENT DOCUMENTS

| | | |
|---|---|---|
| 5,478,000 A | 12/1995 | Jensen |
| 5,784,959 A | 7/1998 | Larios |
| 5,947,025 A | 9/1999 | Huang |
| 6,067,103 A | 5/2000 | Ewert et al. |
| 6,287,030 B1 | 9/2001 | Furuya et al. |
| 6,612,474 B2 | 9/2003 | Shah |
| 6,810,802 B2 | 11/2004 | Huang |
| 7,056,410 B2 | 6/2006 | Kuller et al. |
| 7,195,049 B2* | 3/2007 | Downs ................. B65H 37/005 |
| | | 156/577 |
| 7,404,684 B2 | 7/2008 | Sugimoto et al. |
| 7,669,631 B2 | 3/2010 | Bailey et al. |
| 8,159,349 B2* | 4/2012 | McAllister ............ B65C 9/1865 |
| | | 340/572.1 |
| 8,944,131 B1 | 2/2015 | Williams |
| 9,262,741 B1* | 2/2016 | Williams ........... G06Q 30/0635 |

(Continued)

*Primary Examiner* — Fateh M Obaid

(57) ABSTRACT

A handheld tape dispenser is configured to store a roll of tape within a frame, the roll of tape comprising a plurality of segments of tape each corresponding to a tape node and comprising one or more electronic components. The handheld tape dispenser drives mechanical components of the handheld tape dispenser to draw tape along a tape feed path, resulting in a segment of tape being removed from the roll of tape for deployment. The handheld tape dispenser determines a unique identifier of a tape node corresponding to the removed segment of tape, associates the unique identifier of the tape node with an asset corresponding to the tape node, and stores the association in a local memory. In real-time or at a later time, the handheld tape dispenser transmits the association to a wireless tracking system.

20 Claims, 17 Drawing Sheets

(56) References Cited

U.S. PATENT DOCUMENTS

| | | | | |
|---|---|---|---|---|
| 9,321,607 B2* | 4/2016 | Chen | ................ | B65H 35/0033 |
| 9,670,028 B1* | 6/2017 | Pinto | ................ | B65H 35/0033 |
| 11,003,978 B2* | 5/2021 | Khoche | ................ | H04W 4/38 |
| 2002/0146146 A1* | 10/2002 | Miolla | ................ | G06Q 10/087 |
| | | | | 382/100 |
| 2005/0255275 A1* | 11/2005 | Downs | ................ | C09J 7/38 |
| | | | | 428/41.8 |
| 2006/0169709 A1* | 8/2006 | Bailey | ................ | B65H 35/0073 |
| | | | | 221/26 |
| 2008/0181398 A1* | 7/2008 | Pappu | ................ | H04L 9/085 |
| | | | | 380/28 |
| 2009/0259612 A1* | 10/2009 | Hanson | ................ | H04L 69/22 |
| | | | | 706/47 |
| 2010/0018653 A1* | 1/2010 | Dureiko | ................ | B65H 35/0033 |
| | | | | 156/510 |
| 2011/0018689 A1* | 1/2011 | McAllister | ................ | B65C 9/1865 |
| | | | | 340/10.1 |
| 2014/0226170 A1* | 8/2014 | Ishii | ................ | G06K 15/1806 |
| | | | | 358/1.12 |
| 2014/0342114 A1* | 11/2014 | Beard | ................ | B65D 63/1009 |
| | | | | 427/208.4 |
| 2015/0086597 A1* | 3/2015 | Mallak | ................ | A01N 25/34 |
| | | | | 424/407 |
| 2016/0159603 A1* | 6/2016 | Huang | ................ | B65H 35/0026 |
| | | | | 83/161 |
| 2016/0237320 A1* | 8/2016 | Yamamoto | ................ | C09J 7/22 |
| 2018/0009623 A1 | 1/2018 | Tiedemann et al. | | |
| 2020/0226442 A1* | 7/2020 | Volkerink | ................ | B32B 37/06 |
| 2021/0019092 A1* | 1/2021 | LeCrone | ................ | G06F 3/067 |

* cited by examiner

HANDHELD TAPE NODE DISPENSER AND METHOD

The present disclosure claims priority to U.S. Provisional Patent Application No. 62/992,091, filed Mar. 19, 2020, which is incorporated herein in its entirety.

FIELD OF THE DISCLOSURE

The disclosure generally relates to tape dispensers and, more particularly, to handheld tape node dispensers that include printing and cutting functionalities in-line with dispensing.

BACKGROUND

Assets being transported are often sealed and labeled with tape or stickers, which ensure that assets are not tampered with and that identifying information about the asset is attached to the asset at all times. Tape may provide, for example, printed barcodes, product codes, and shipping information, which may be used during transportation of assets to determine the source of the assets, the contents of the assets, the destination of the assets, and the like.

Conventionally, tape is wound around a cylindrical core and dispensed from a tape dispenser. The tape dispenser may include a printing unit for printing characters, information, and ornamentation on the surface of the tape, and the tape may include an adhesive bottom layer covered by a release liner that is removed before the tape is applied to a surface. However, conventional tape dispensers require users to manually input information to be printed, remove individual segments of tape, and remove a release liner if one is present. In environments having large numbers of assets requiring labels, the process of generating and applying tape from conventional tape dispensers may become time-consuming.

SUMMARY

A handheld tape dispenser for dispensing adhesive tape nodes in uniform length segments or other wireless tracking devices comprises a frame, a tape feed path, an electrical power source, a processor and wireless interface, and one or more other mechanical components. The handheld tape dispenser is configured to perform operations comprising storing a roll of tape within the frame of the handheld tape dispenser, as on a spool fastener, and to draw tape from the roll of tape along the tape feed path, resulting a segment of tape being removed from the roll of tape for deployment. The removal of the segment of tape may be performed automatically by the handheld tape dispenser, such as by a cutting or tearing mechanism, or may be performed manually by an operator of the handheld tape dispenser.

The processor and wireless interface of the handheld tape dispenser are configured to associate the dispensed tape nodes with corresponding assets. The handheld tape dispenser determines a unique identifier of the tape node corresponding to the removed segment of tape during or following dispensing and associates the unique identifier of the tape node with an asset corresponding to the tape node. The handheld tape dispenser stores the association in a local memory and transmits the association in real-time or at a later time to a wireless tracking system.

In some embodiments, the handheld tape dispenser may provide other functions, such as printing barcodes, labels, tracking numbers or information, or other indicia on the tape node during dispensing; activating the tape node following deployment; initiating audits or other self-tests of the tape node following deployment; and the like.

The handheld tape dispenser and the method and system thereof for automatically dispensing tape nodes and wireless nodes saves users time and simplifies the installation process for tape nodes and wireless devices that include electronic components tapes. Using the disclosed handheld tape dispenser, method, and system thereof, the efficiency of users when installing a large fleet of tape nodes and wireless devices may be increased and errors occurring during installation may be mitigated.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

Introduction

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "wireless tracking system," "hierarchical communications network," "distributed agent operating system," and the like are used interchangeably herein to refer to a system or network of wireless nodes.

Adhesive Tape Platform

Figure 1A:
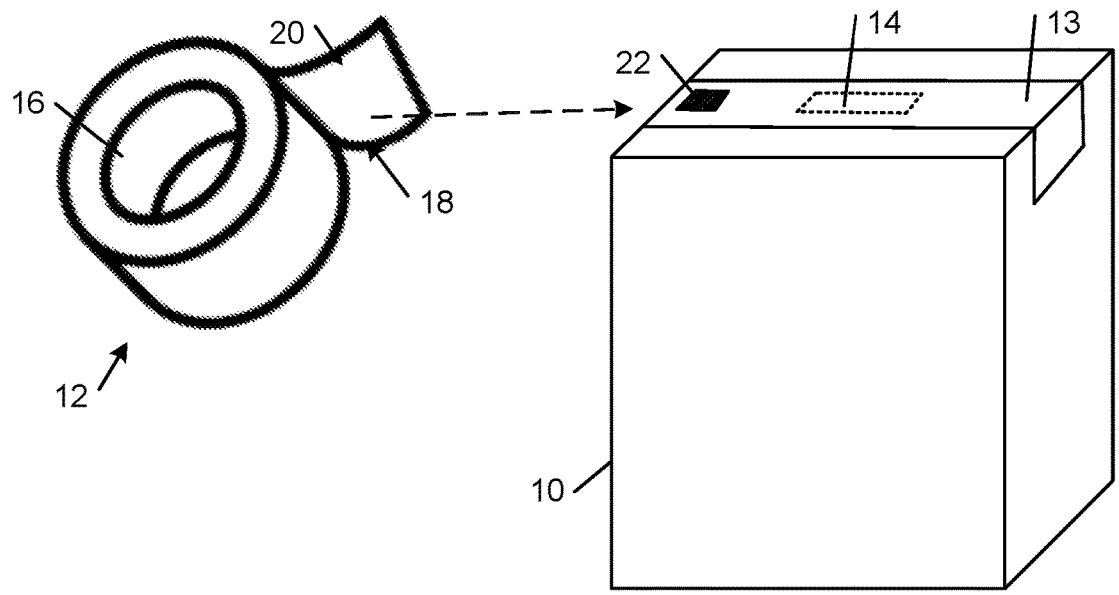
FIG. 1A is a diagrammatic view of an asset that has been sealed for shipment using a segment of an example adhesive tape platform dispensed from a roll.

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
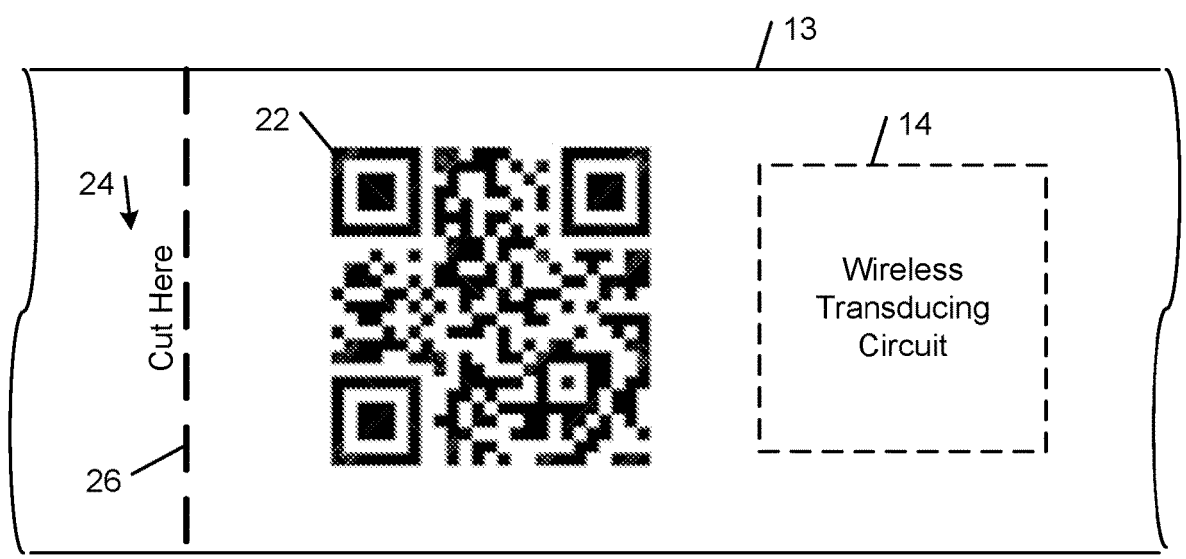
FIG. 1B is a diagrammatic top view of a portion of the segment of the example adhesive tape platform shown in FIG. 1A.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
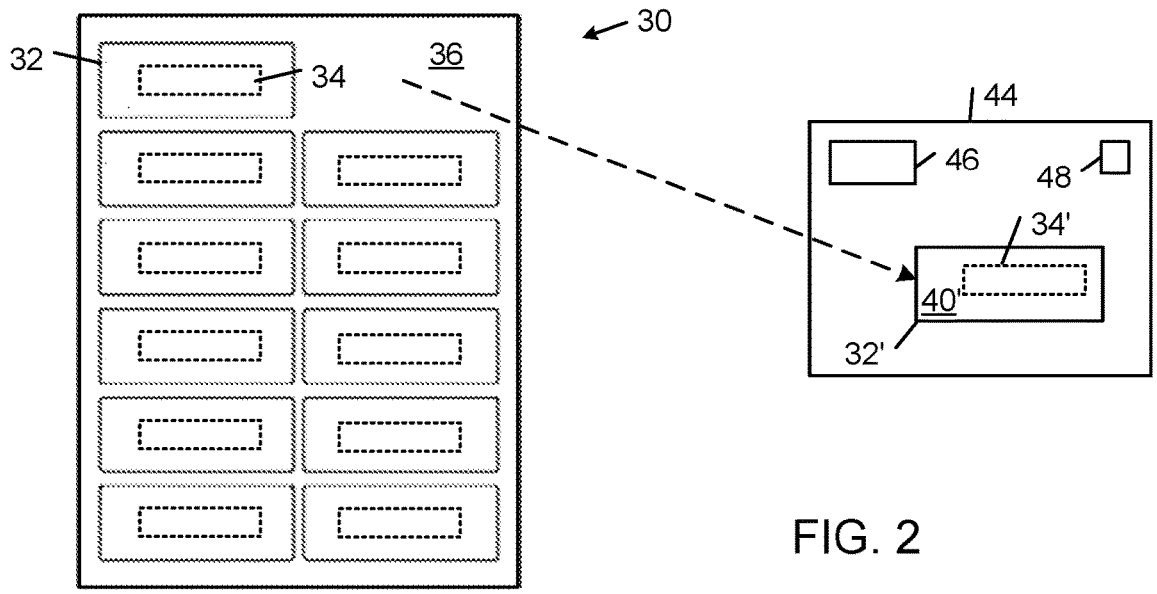
FIG. 2 is a diagrammatic view of an example of an envelope carrying a segment of an example adhesive tape platform dispensed from a backing sheet.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of an asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
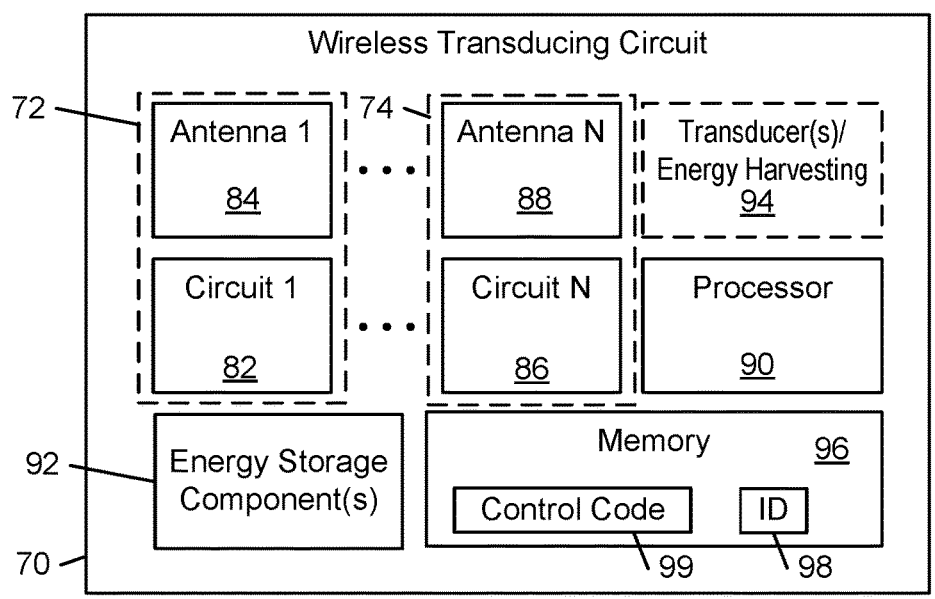
FIG. 3 is a schematic view of an example segment of an adhesive tape platform.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
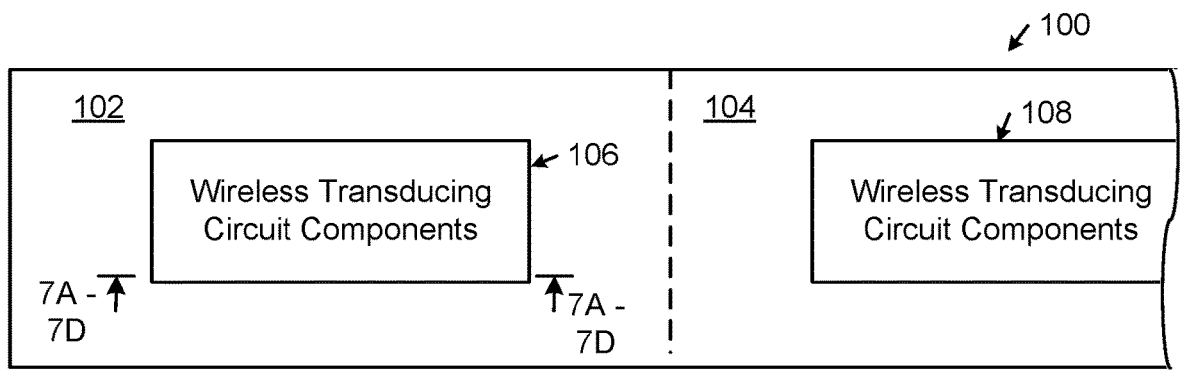
FIG. 4 is a diagrammatic top view of a length of an example adhesive tape platform.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U. S. Pat. No. 10,262,255, issued Apr. 15, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
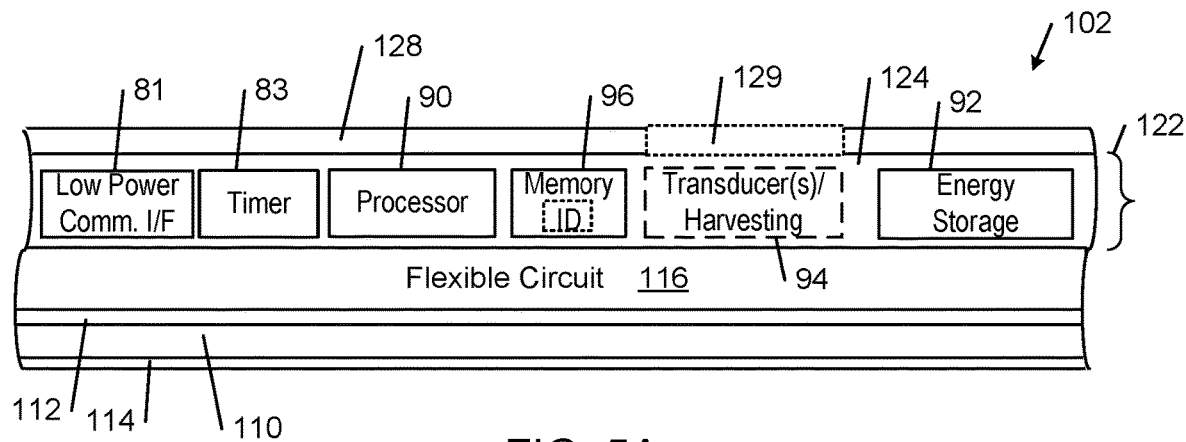
FIGS. 5A-5C show diagrammatic cross-sectional side views of portions of different respective adhesive tape platforms.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
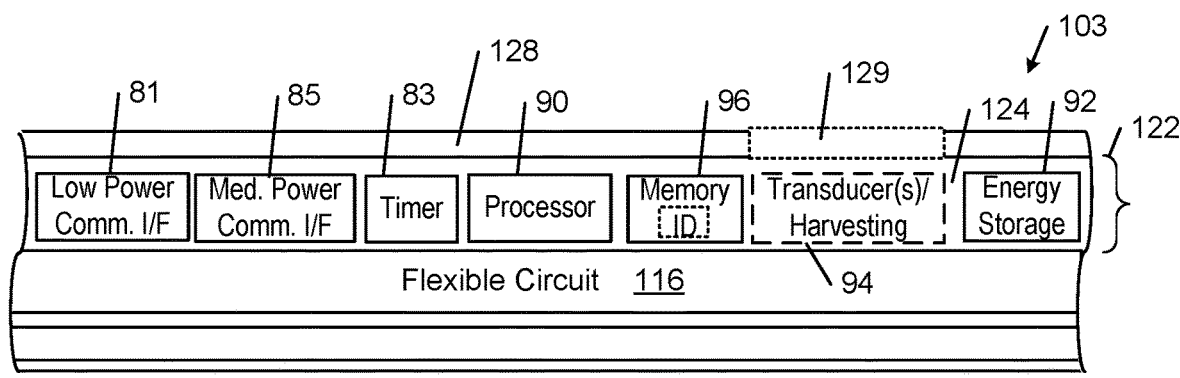

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
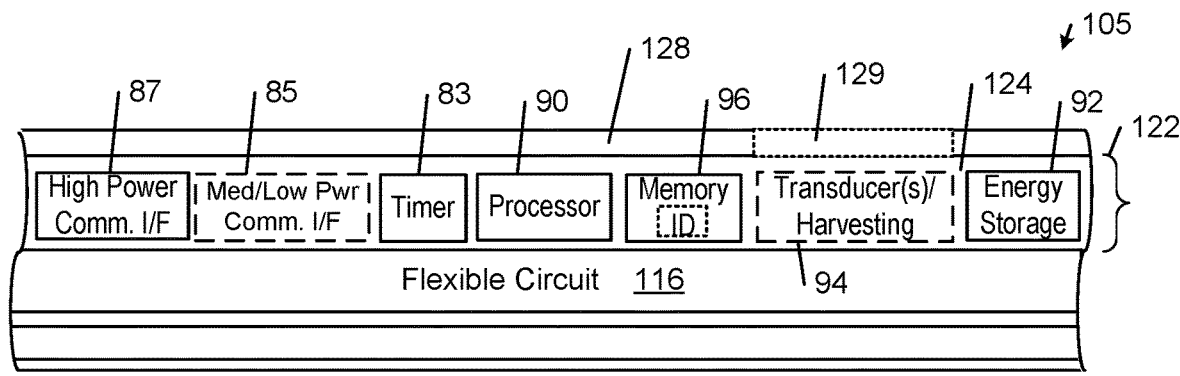

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 12A:
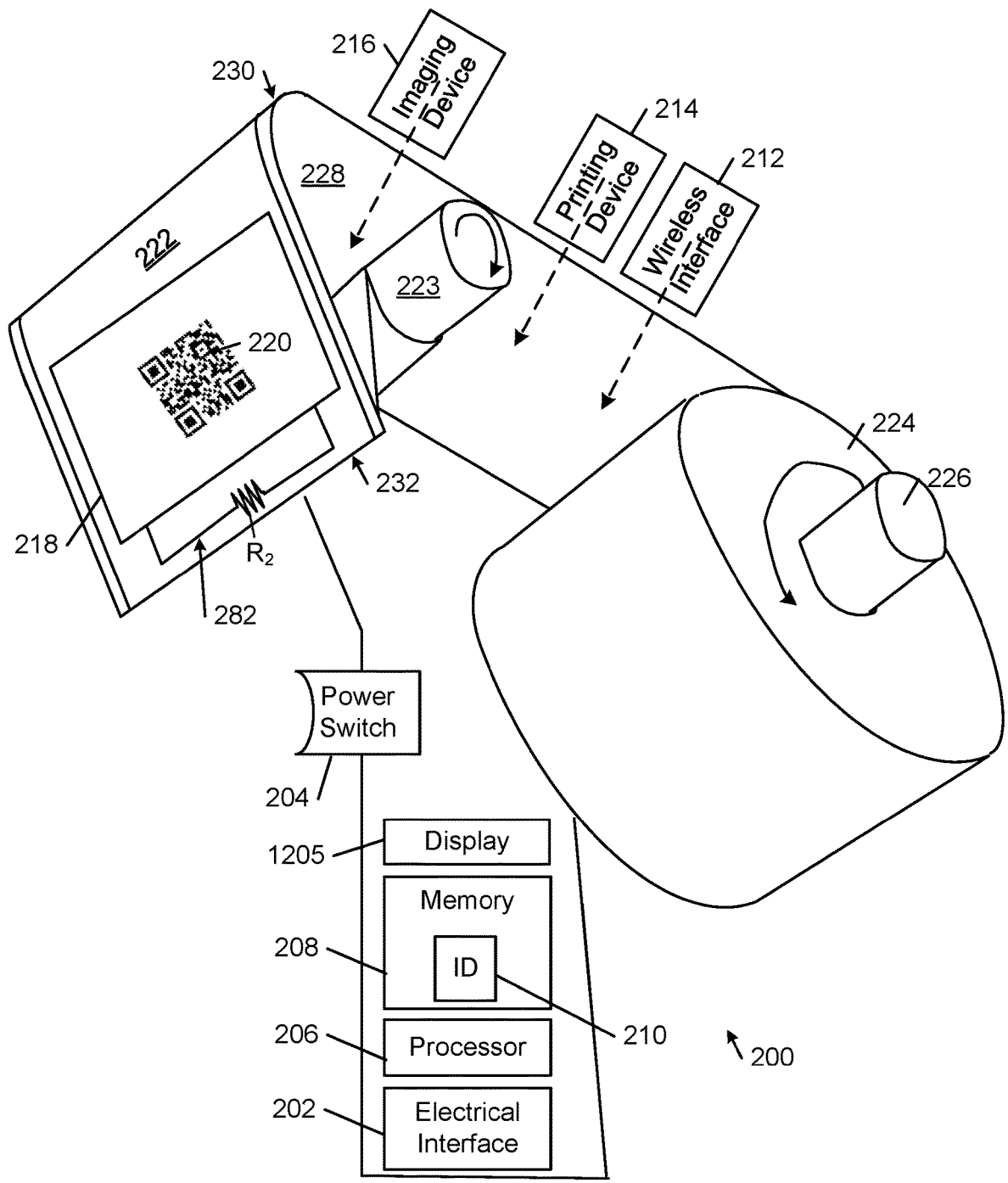
FIGS. 12A-12B are diagrammatic views of embodiments of handheld tape dispensers.
Figure 12B:
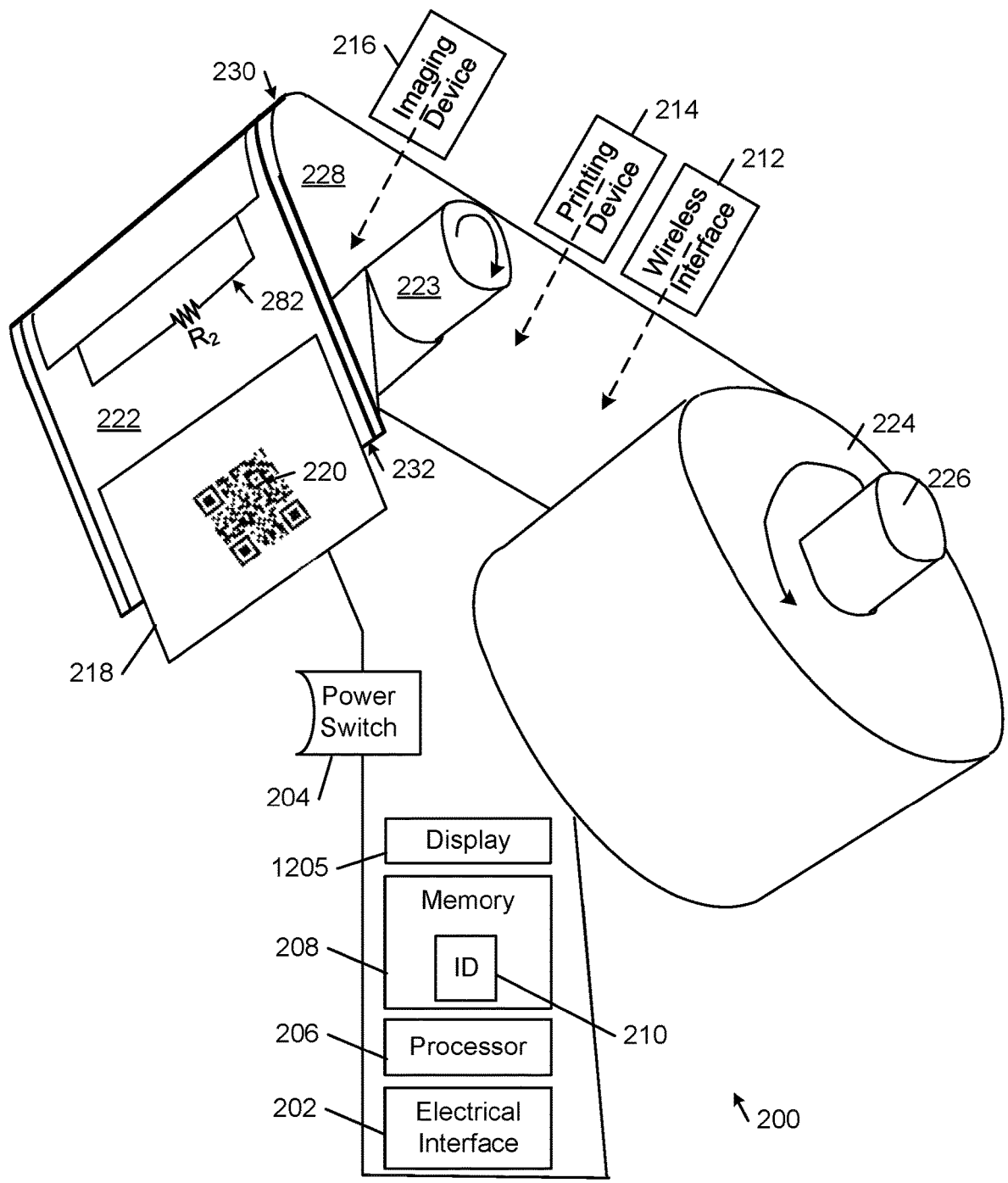
Figure 13:
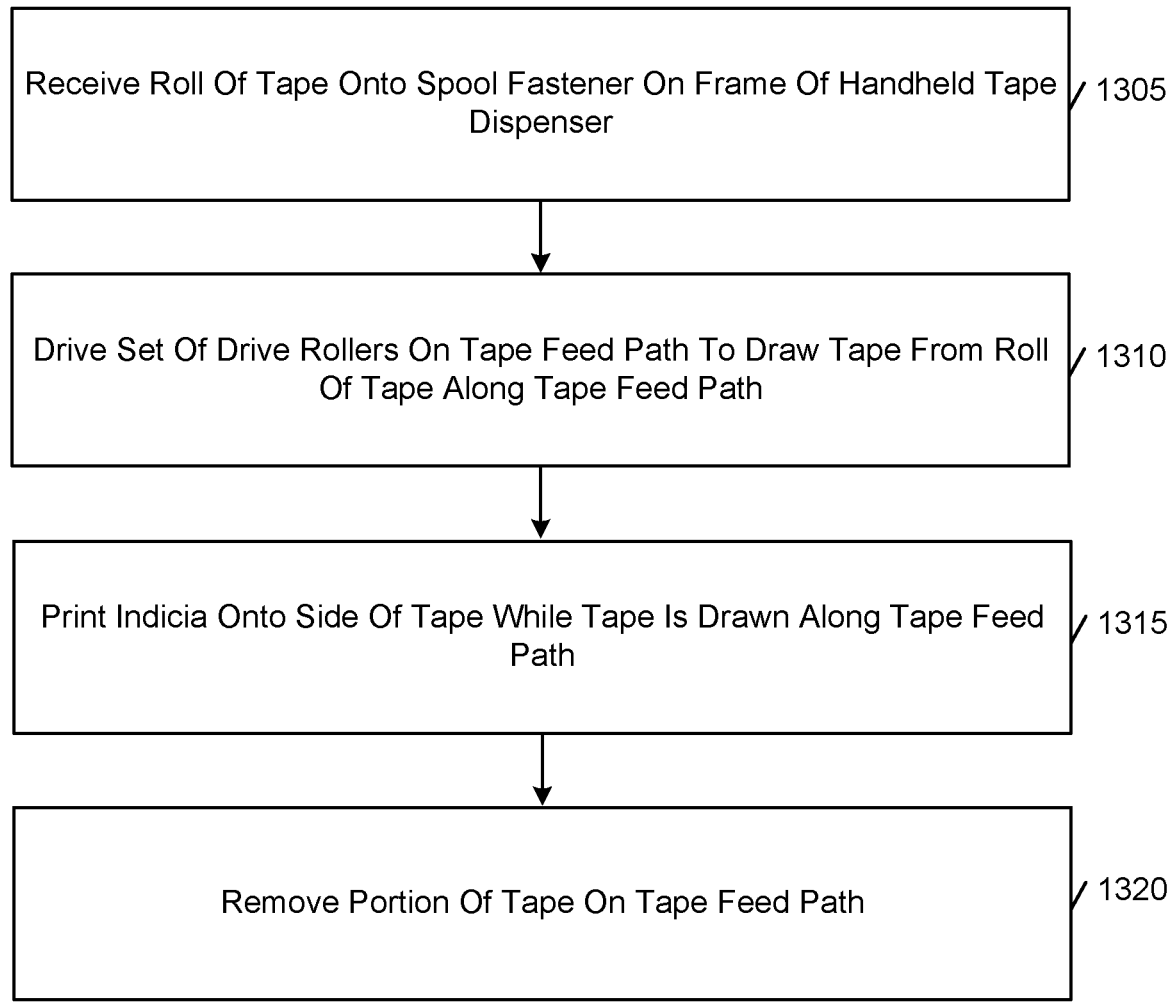
FIG. 13 is a flow diagram of a method for operation of a handheld tape dispenser, according to some embodiments.

In some embodiments, the adhesive tape platforms discussed in conjunction with FIGS. 1A-5C are dispensed by a handheld tape dispenser, as discussed further in conjunction with FIGS. 11-13. The handheld tape dispenser is configured to receive a roll of tape, the roll of tape comprising a plurality of adhesive tape platforms distributed throughout the roll, e.g., in uniform length segments, and to dispense the roll of tape for use by a wireless tracking system, e.g., in an environment as illustrated in FIG. 6.

Deployment of Tape Nodes

Figure 6:
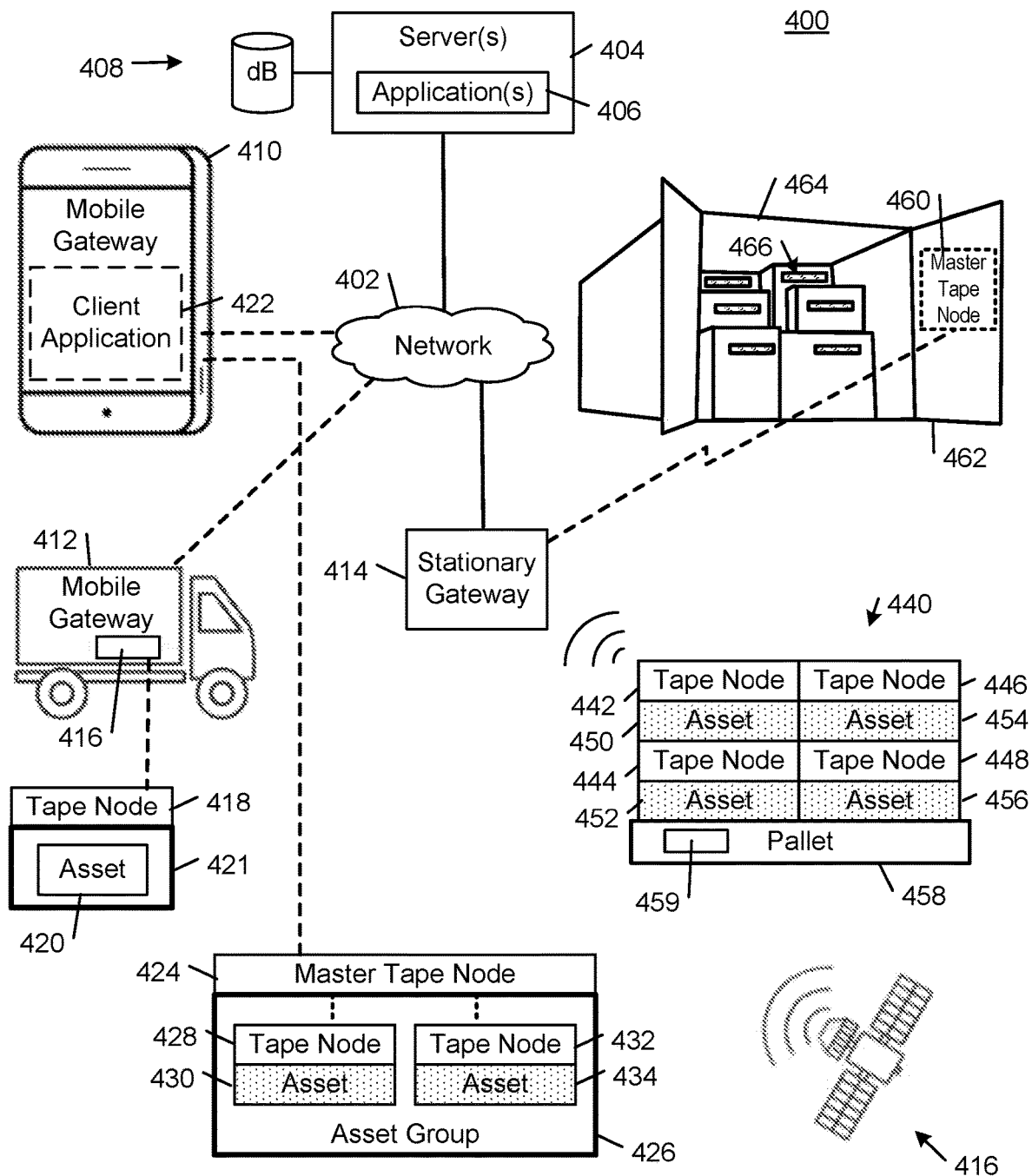
FIG. 6 is a diagrammatic view of an example of a network environment supporting communications with segments of an adhesive tape platform.

FIG. 6 shows an example network communications environment 400 that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). The example network communication environment 400 may also be referred to as a wireless tracking system 400. The nodes of the wireless tracking system 400 may refer to the tape nodes, other wireless devices, the gateway devices, client devices, servers, and other components of the wireless tracking system 400. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. As described in the embodiments of FIGS. 11-14, the tape nodes are deployed by an automated handheld tape dispenser. In this process, a tape node typically is separated from a roll or sheet and adhered to an asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 6, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels or assets that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Hierarchical Wireless Communications Network

Figure 7:
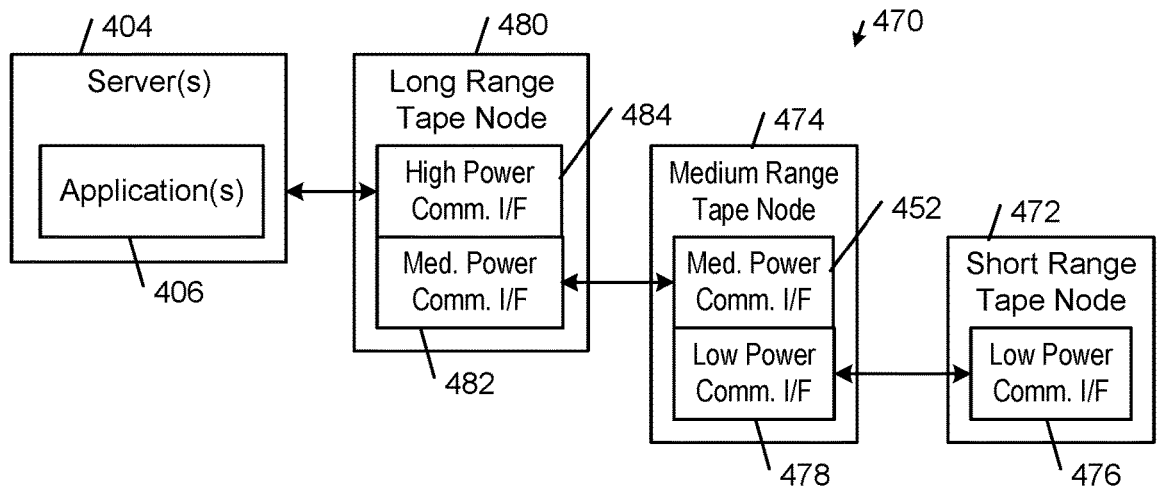
FIG. 7 is a diagrammatic view of a hierarchical communications network.

FIG. 7 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 8:
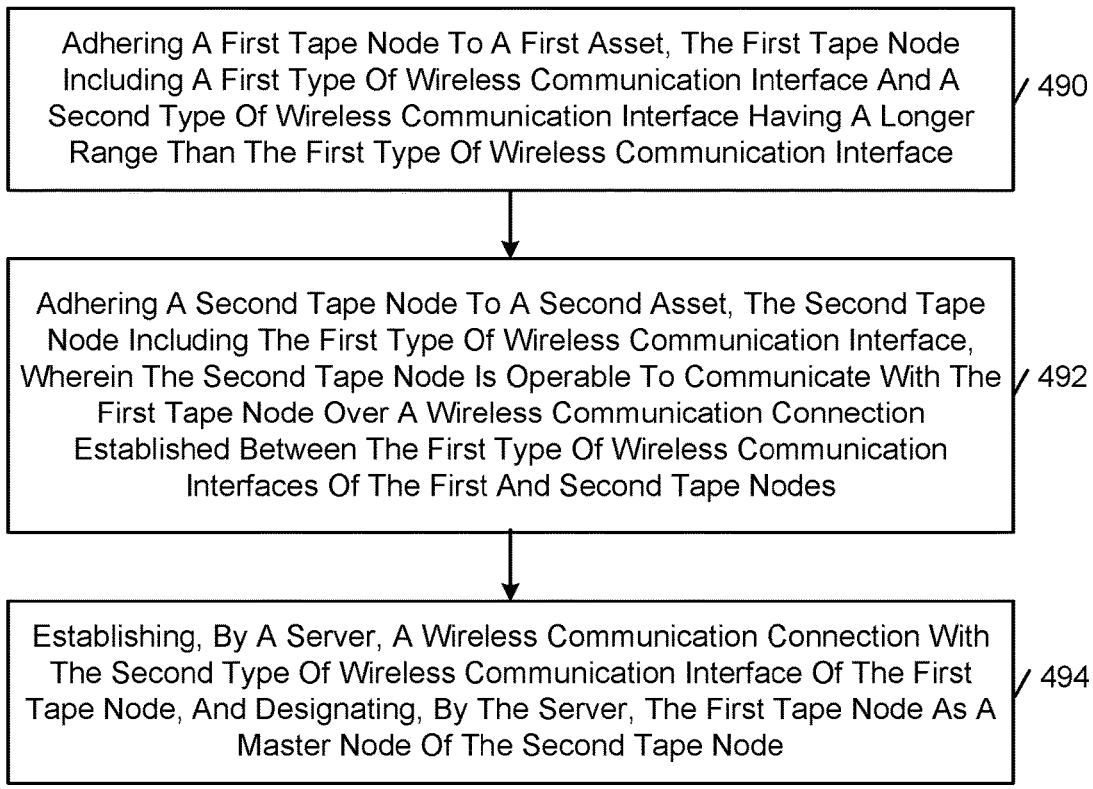
FIG. 8 is a flow diagram of a method of creating a hierarchical communications network.

FIG. 8 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 8, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 8, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 8, block 494).

In some embodiments, the second tape node is assigned the role of the master tape node with respect to the first tape node.

Distributed Agent Operating System

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 9A:
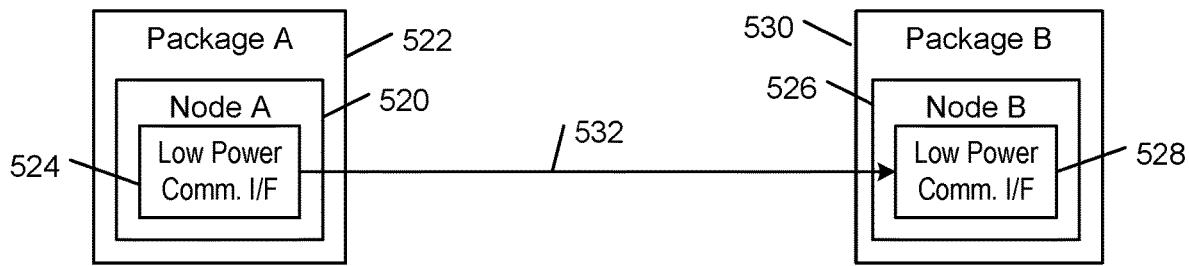
FIGS. 9A-9E are diagrammatic views of exemplary use cases for a distributed agent operating system.

Referring to FIG. 9A, a node 520 (Node A) is associated with a package 522 (Package A). In some embodiments, the node 520 may be implemented as a tape node that is used to seal the package 522 or it may be implemented as a label node that is used to label the package 522; alternatively, the node 520 may be implemented as a non-tape node that is inserted within the package 522 or embedded in or otherwise attached to the interior or exterior of the package 522. In the illustrated embodiment, the node 520 includes a low power communications interface 524 (e.g., a Bluetooth Low Energy communications interface). Another node 526 (Node B), which is associated with another package 530 (Package B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 9B:
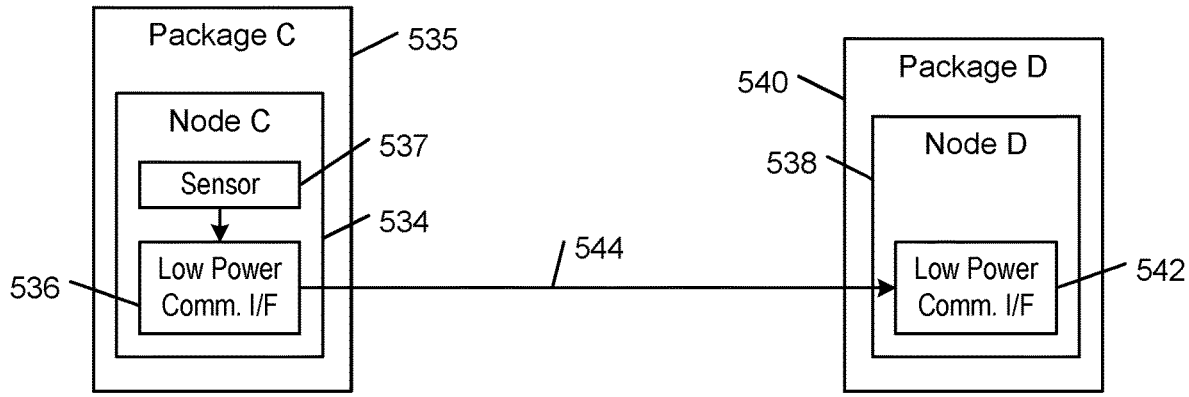

Referring to FIG. 9B, a node 534 (Node C) is associated with a package 535 (Package C). In the illustrated embodiment, the Node C includes a low power communications interface 536 (e.g., a Bluetooth Low Energy communications interface), and a sensor 537 (e.g., a temperature sensor). Another node 538 (Node D), which is associated with another package 540 (Package D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 9C:
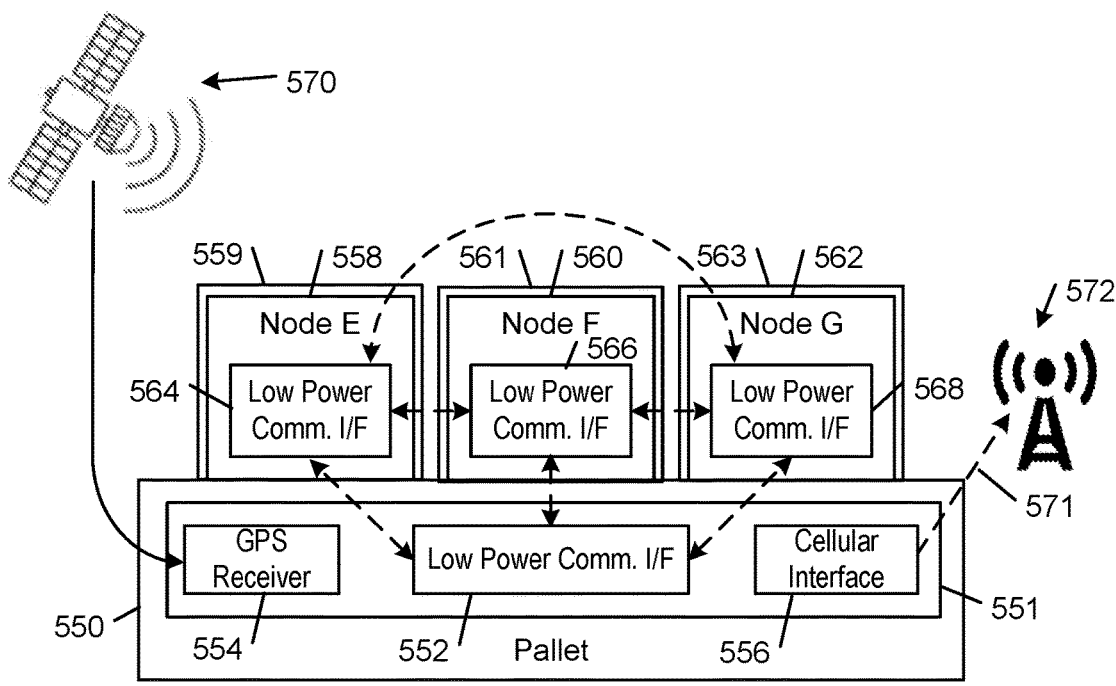

Referring to FIG. 9C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing packages 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the packages 559, 561, 563 are grouped together because they are related. For example, the packages 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the packages 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding packages 559, 561, 563 are intended to be grouped together (e.g., they share the same itinerary or certain segments of the same itinerary), the server authorizes the master node 551 to associate the peripheral nodes 558, 560, 562 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi-package group, the master node 551 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 558, 560, 562 include environmental sensors for obtaining information regarding environmental conditions in the vicinity of the associated packages 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the packages 559, 561, 563 from the master node 551 can be estimated based on the average signal strength of the advertising packets that the master node 551 receives from the respective peripheral node. The master node 551 can then transmit its own location and the locations of the package nodes E, F, and G to a server over a cellular interface connection with a cell tower 572. Other methods of determining the distance of each of the packages 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if packages that are supposed to travel together no longer travel together, and raise an alert. For example, a node (e.g., the master node 551 or one of the peripheral nodes 558, 560, 562) alerts the server when the node determines that a particular package 559 is being or has already been improperly separated from the group of packages. The node may determine that there has been an improper separation of the particular package 559 in a variety of ways. For example, the associated node 558 that is bound to the particular package 559 may include an accelerometer that generates a signal in response to movement of the package from the pallet. In accordance with its intelligent agent program code, the associated node 558 determines that the master node 551 has not disassociated the particular package 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 9D:
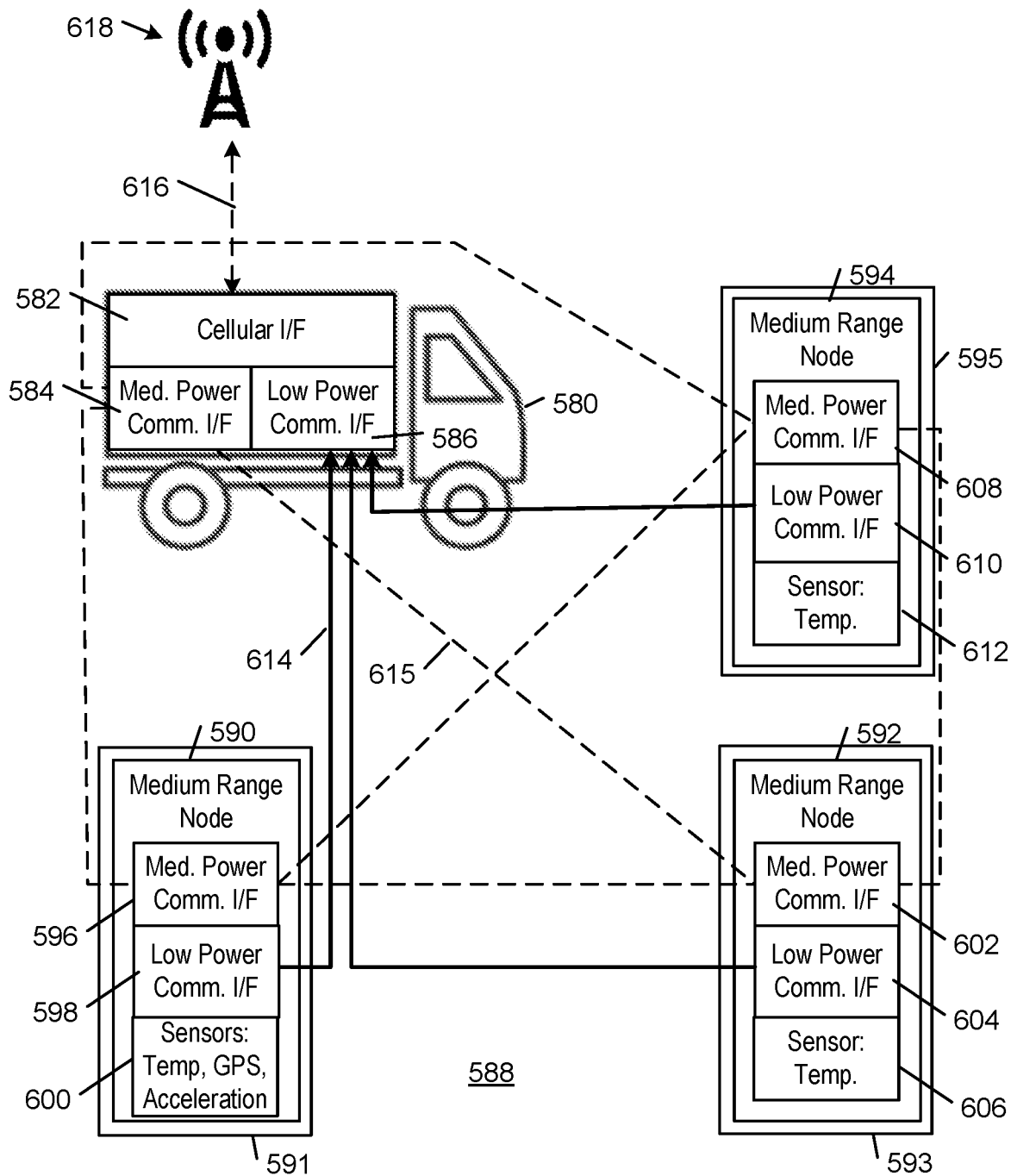

Referring to FIG. 9D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective packages 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the package nodes 590, 592, 594 and the truck 580 is connected to each of the other ones of the package nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., packages, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 9E:
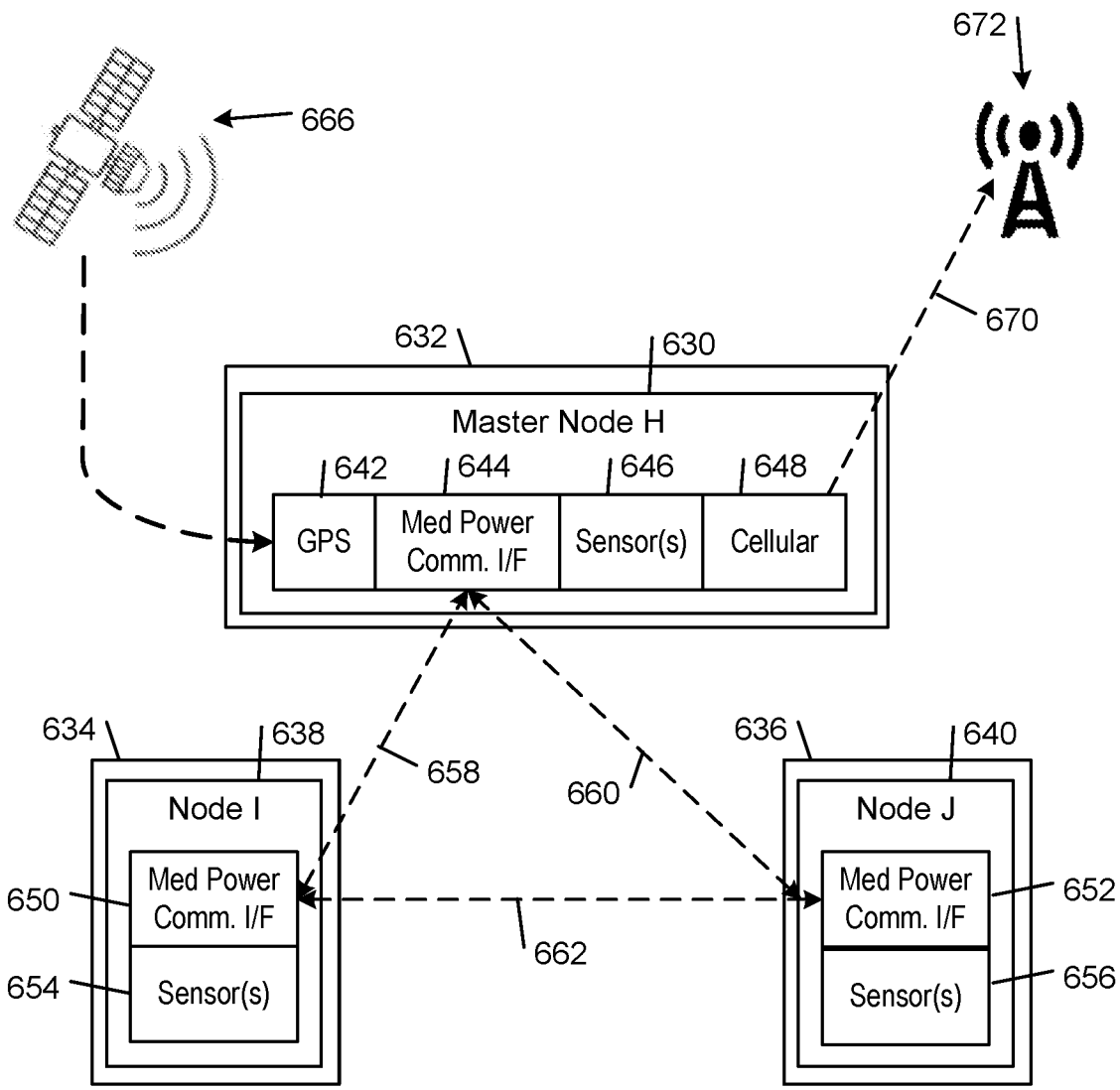

Referring to FIG. 9E, a master node 630 is associated with an item 632 (e.g., a package) and grouped together with other items 634, 636 (e.g., packages) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated packages 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that they are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the packages 634, 636 from the master node 630 can be estimated based on the average signal strength of the advertising packets that the master node 630 receives from the respective peripheral node. The master node 630 can then transmit its own location and the locations of the package nodes E, F, and G to a server over a cellular interface connection with a cell tower 672. Other methods of determining the distance of each of the packages 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Figure 10A:
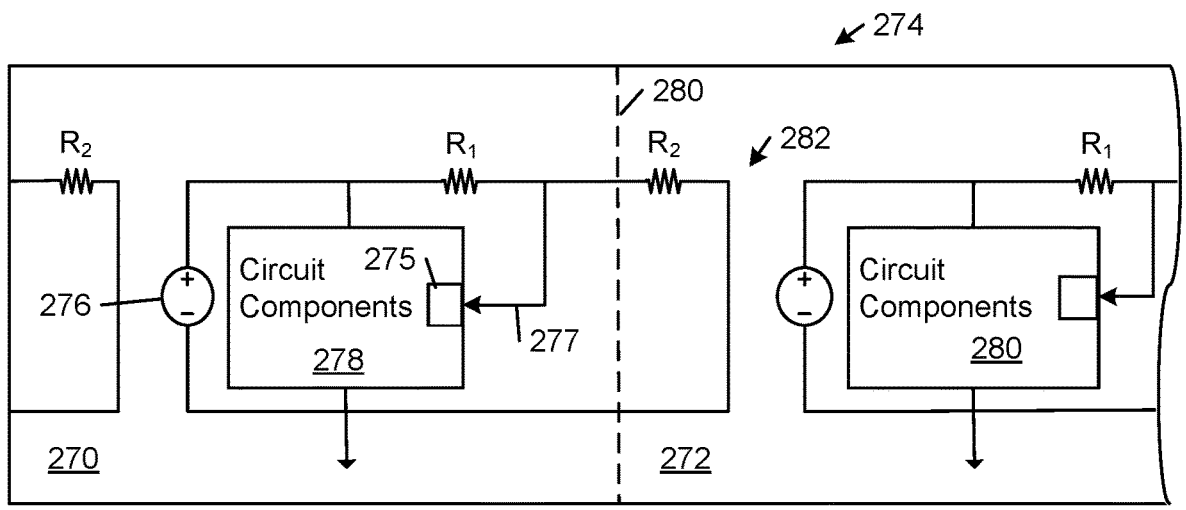
FIGS. 10A-10C are diagrammatic top views of a length of an example tracking adhesive product.

Referring to FIG. 10A, in some examples, each of one or more of the segments 270, 272 of a tracking adhesive product 274 includes a respective circuit 275 that delivers power from the respective energy source 276 to the respective tracking circuit 278 (e.g., a processor and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the tracking adhesive product 274, for example, by cutting across the tracking adhesive product 274 at a designated location (e.g., along a designated cut-line 280). In particular, in its initial, un-cut state, a minimal amount of current flows through the resistors $R_1$ and $R_2$. As a result, the voltage on the wake node 270 remains below the threshold turn-on level. After the user cuts across the tracking adhesive product 274 along the designated cut-line 280, the user creates an open circuit in the loop 282, which pulls the voltage of the wake node above the threshold level and turns on the wake circuit 275. As a result, the voltage across the energy source 276 will appear across the tracking circuit 278 and, thereby, turn on the segment 270. In particular embodiments, the resistance vale of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more of the respective tracking components 278 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 10B:
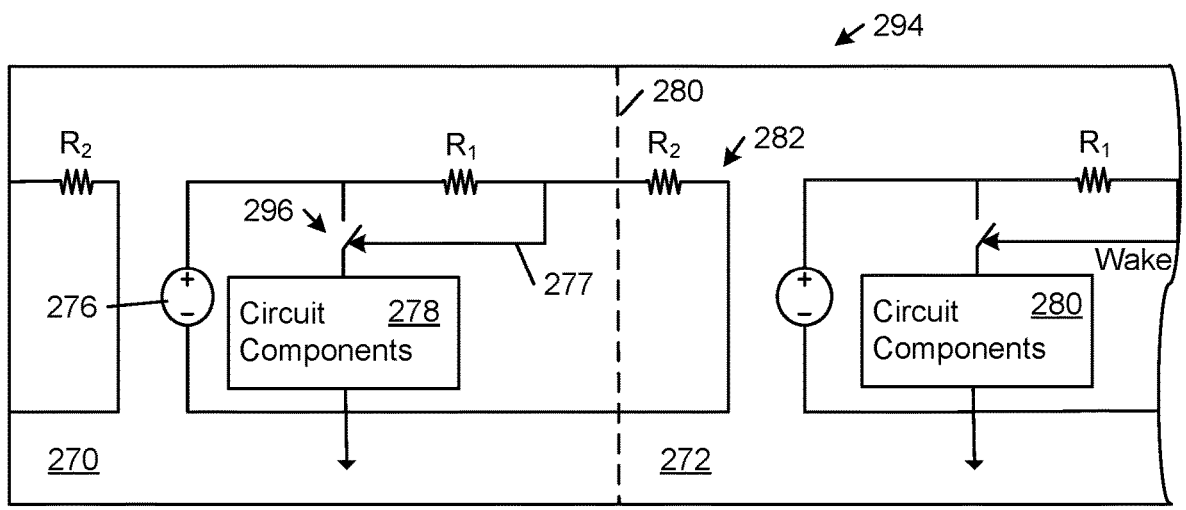

FIG. 10B shows another example of a tracking adhesive product 294 that delivers power from the respective energy source 276 to the respective tracking circuit 278 (e.g., a processor and one or more wireless communications circuits) in response to an event. This example is similar in structure and operation as the tracking adhesive product 294 shown in FIG. 10A, except that the wake circuit 275 is replaced by a switch 296 that is configured to transition from an open state to a closed state when the voltage on the switch node 277 exceeds a threshold level. In the initial state of the tracking adhesive product 294, the voltage on the switch node is below the threshold level as a result of the low current level flowing through the resistors $R_1$ and $R_2$. After the user cuts across the tracking adhesive product 294 along the designated cut-line 280, the user creates an open circuit in the loop 282, which pulls up the voltage on the switch node above the threshold level to close the switch 296 and turn on the tracking circuit 278.

Figure 10C:
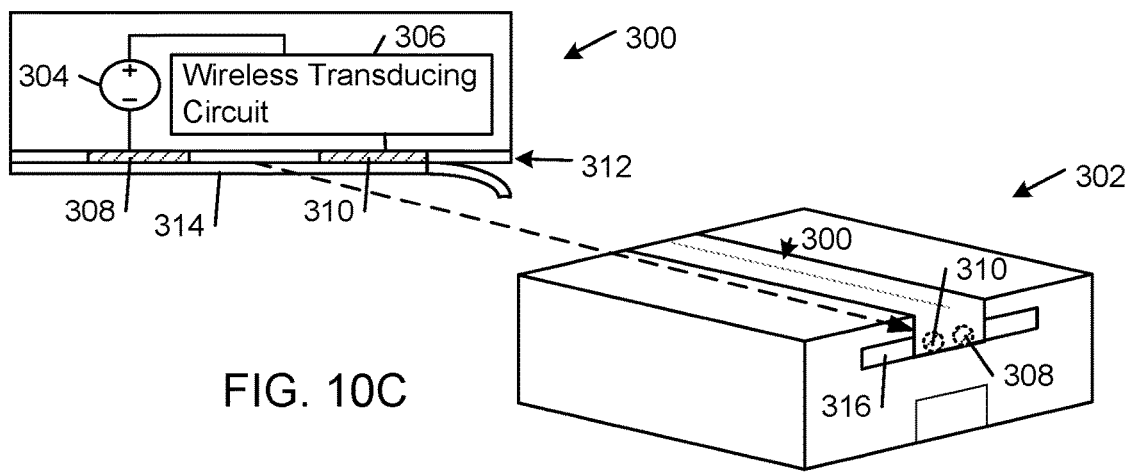

FIG. 10C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310. In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Handheld Tape Node Dispenser

A handheld tape dispenser is used to print and cut adhesive tape nodes in uniform length segments. In some embodiments, the handheld tape dispenser initiates an event triggering the adhesive tape nodes to begin communicating with a wireless tracking system and/or to begin capturing sensor data about an environment of an asset. Embodiments of the handheld tape dispenser may include different sets of internal components than those described herein, ranging from, for example, a fully configured electrically powered embodiment as illustrated in conjunction with FIG. 11A to a manually powered handheld tape dispenser configuration. In some embodiments, the handheld tape dispenser is configured to receive the roll 16 of adhesive tape nodes illustrated in FIG. 1A, and the tape segments are the platforms and/or nodes illustrated in FIGS. 1A-1B, 2, 3, 4, 5A-5C, and 10A-10B.

FIG. 11 illustrates an example handheld tape dispenser 150, in accordance with an embodiment. The handheld tape dispenser 150 comprises a spool fastener 154 that is operative to receive a roll 155 of wireless tape nodes 156, e.g., wherein the roll comprises a plurality of segments and each segment of the plurality of segment is a wireless tape node. The wireless tape nodes 156 are dispensed along a tape feed path 158 that includes a backend roller 160, a pair of drive rollers 162, and a frontend roller 164. A number of components are installed along the tape feed path 158 between the backend roller 160 and the front-end roller 164, including a memory 168, a processor 166, a wireless interface 170, a printing device 172, an optional imaging device 174, and a power switch 175 in some embodiments.

In other embodiments, the handheld tape dispenser 150 may comprise additional, fewer, or different components, and the components may be arranged or oriented differently than shown in FIG. 11. For example, in some embodiments the handheld tape dispenser 150 comprises a holding and dispensing mechanism in place of the spool fastener 154, the holding mechanism configured to receive a stack or set of tape nodes and to dispense each tape node individually into the tape feed path 158. In other examples, the spool fastener 154 feeds tape into a tape feed path 158 without a backend roller 160, such that the tape feed path is level with the spool fastener 154, or the backend roller 160 and/or the front-end roller 164 may be In some embodiments, these components operate and function as described above in conjunction with FIG. 11.

In some embodiments, the memory 168 stores machine readable program code that is executable by the processor 166 to execute one or more algorithms or applications that control or change the state or operation of the handheld tape node dispenser 150. For example, the processor 166 may send instructions to the wireless interface 170 to interrogate the memory of the current tape node to determine an identifier associated with the current tape node segment. The processor 166 may store the determined identifier in association with an asset of the wireless tracking system, such as a tracking number, barcode, or other identifier of an asset for tracking, and may transmit via the wireless interface 170 information describing the determined identifier in conjunction with an associated asset to a cloud, server, or other node of the wireless tracking system. The transmitting may be performed in real-time, e.g., responsive to the processor 166 determining the identifier of the current tape node and forming an association with the determined identifier to an asset, or may be performed in batch uploads, e.g., at scheduled times or when a connection to a cloud, server, or other node of the wireless tracking system is available.

The processor may also perform, initiate, or otherwise enable testing of tape nodes during the deployment process. In some embodiments, tape nodes are configured to perform self-tests, such as testing that certain functionalities are performing as expected, that a battery level or other measurable quantity of the tape node is at or above a threshold level, and the like. During deployment, the processor is configured to initiate self-testing of tape node segments and to receive, responsive to completion of self-testing, results of the self-testing via the wireless interfaced 170. The handheld tape dispenser 150 may further comprise a mechanism for displaying results of self-testing, such as a display (not shown in FIG. 11A). The display may be, for example, an LED light configured to light up a first color (e.g., green) responsive to a passed self-test and a second color (e.g., red) responsive to a failed self-test.

The processor also may send instructions to the printing device 172 to print markings and/or other indicia (e.g., barcodes, such as one and two-dimensional barcodes) on an exposed surface of the wireless tape 156, e.g., on a top surface or front side of the wireless tape. In some embodiments, the processor may send instructions to the printing device 172 to print markings and/or other indicia corresponding to a determined identifier of the current tape node segment and/or corresponding to an asset associated with the current tape node segment. For example, the processor may receive information describing markings and/or other indicia to print via communications from a client device receiving user input by an operator of the handheld tape dispenser or a cloud or server of the wireless tracking system. The cloud or server of the wireless tracking system may also or alternatively, for example, relay information from a third-party system, e.g., a transportation service having tracking information for assets of the wireless tracking system, or from other entities in an environment of the handheld tape dispenser, e.g., a gateway node associated with an area, conveyer belt, pallet, or the like. In other embodiments, the processor may generate information to print, e.g., may generate a tracking number to be associated with an asset, or may receive information via a barcode or QR scanning module of the handheld tape dispenser including a tracking number, tracking information, or other markings and/or indicia to print on a corresponding tape node. In other embodiments, the top surface of the wireless tape 156 is marked with pre-printed markings. For example, the top surface of the wireless tape 156 may include a visible two-dimensional barcode and a visible cut-line marked transversely across each segment of the wireless tape 156 that will turn-on the corresponding segment of the tape node when the segment is cut along a cut-line. In some embodiments, the tape is perforated along the corresponding cut-line associated with each segment of tape 156. In another example, the top surface of the wireless tape 156 may include one or more markings corresponding to capabilities of the wireless tape, e.g., such that wireless tape having GPS sensors may be marked with a first text or symbol to indicate GPS location functionality, while wireless tape having only local communications systems may be marked with a second text or symbol to indicate local communications functionalities.

In some embodiments, because battery power is finite and the power needs of any particular tape node segment generally is unknown until an asset and/or transportation information are assigned to the given tape node segment, it is beneficial for tape node segments to preserve battery life when inactive (e.g., not yet deployed). As such, the tape node segments may be preconfigured in a power-off or hibernation state and remain in the power-off or hibernation state until a predetermined event occurs. In a power-off or hibernation state, tape node segments do not perform standard functions such as capturing sensor data or communicating wirelessly with the wireless tracking system, or perform standard functions infrequently, e.g., once a day, once every hour. In some cases, the predetermined event indicates that the tape node segment has been deployed for use in the field. Example events include cutting a tape node segment from a roll, bending a tape node segment as it is being peeled off of a roll, separating a tape node segment from a sheet, and detecting a change in state of the tape node segment.

As previously discussed in conjunction with FIGS. 10A-10C, each of the one or more tape node segments 270, 272 may comprise a respective circuit 275 that delivers power from the respective energy source 276 to the respective circuit 278 (e.g., a processor and one or more wireless communications circuits) in response to an event. The wake circuit 275 is configured to transition from an off state to an on state when the voltage on the wake node 277 exceeds a threshold level. In some embodiment of FIG. 11A, a tape node segment may comprise the wake circuit as described in FIGS. 10A-10B, such that when the tape node segment is cut from a roll by the tape node dispenser, a voltage across the energy source will appear across the tape node segment circuit 278 and thereby turn on the tape node segment 270.

Referring back to FIG. 11A, a tape cutter 176 is used to cut segments of the wireless tape 156 from the roll 155. In some embodiments, the tape cutter 176 enables a user to manually cut a segment of the wireless tape 156 from the roll 155 by applying the wireless tape 156 against a serrated edge of the cutter 176 and pulling the wireless tape against the serrated edge of the cutter 176 until the distal tape node segment tears free of the roll 155. In other embodiments, the tape cutter 176 is configured to cut a segment of the wireless tape 156 from the roll 155 using a guillotine blade. As explained above, in some embodiments, the wireless tape 156 includes perforations across the tape node segments along respective transverse cut-lines that are oriented transversely across the feed path 158 to facilitate dispensing segments of the tape nodes.

In operation, a user of the handheld tape dispenser 150 manipulates the handheld tape dispenser by holding a handle 178. In some embodiments, the handle 178 houses an electrical interface 180 for connecting a source of electrical power to the processor 166, the memory 168, the wireless interface 170, the printing device 172, the imaging device 174 (if present), and a motor (if present) that drives the drive rollers 162 to dispense segments 182 of the tape 156. The electrical power source may be implemented by a wide variety of electrical power sources, including one or more batteries, a main power source, an energy harvesting power source (e.g., a solar cell).

In some embodiments, an entity of a wireless tracking system 400, as described in conjunction with FIG. 6, wirelessly communicates with the wireless interface of the handheld tape dispenser 150. For example, an entity of the wireless tracking system 400 may comprise one or more of: a server of the wireless tracking system, a cloud network of the wireless tracking system, one or more tape nodes of the wireless tracking system, one or more gateway nodes of the wireless tracking system, one or more client devices of the wireless tracking system, and other infrastructure of the wireless tracking system.

In some embodiments, the wireless tracking system 400 is configured to update firmware, software or other program code in the processor 166, the memory 168, the wireless interface 170, the printing device 172, and the imaging device 174 (if present). In some embodiments, the wireless tracking system 400 communicates with the printing device 172 through the wireless interface 170 to change the method used by the printing device 170 to print markings and other indicia on the segments 182 of the wireless tape 156. For example, the wireless tracking system 400 may transmit an instruction through the wireless interface 170 to change bar code generation methods, e.g., switching from printing a particular one-dimensional bar code to printing a particular two-dimensional bar code type, updating a particular bar code or QR code, changing or adding text printed on the tape node (e.g., information describing an asset, a transportation destination, a timestamp, etc.), and the like. In other embodiments, the wireless tracking system receives, from the wireless interface 170 of the handheld tape dispenser, an identifier of the tape node segment 182 currently being dispensed as determined by the handheld tape dispenser 151 and correlates the tape node segment identifier with either a pre-printed machine-readable code or a machine-readable identifier printed by the printing device 172 and optionally read by the imaging device 174. In other embodiments, the wireless tracking system receives, from the wireless interface 170 of the handheld tape dispenser, an identifier of the tape node segment 182 currently being dispensed and a corresponding machine-readable code, tracking number, barcode, or other identifier of an asset of the wireless tracking system. The tape node segment identifier and the machine-readable identifier may be further stored by one or more of the wireless tracking system 400 and/or the handheld tape dispenser 150 in the memory 168. In some examples, the machine-readable codes are two-dimensional barcodes.

The wireless interface 170 comprises one or more communications systems configured to interact with one or more entities of the wireless tracking system. In some embodiments, the wireless interface 170 comprises a medium or long range communications interface, e.g., LoRa, Wi-Fi, or cellular communications, to enable communications between the handheld tape dispenser and clouds, servers, gateway nodes, and other like entities of the wireless tracking system. In some embodiments, when the handheld tape dispenser is active and a communication connection is established between the handheld tape dispenser and another entity of the wireless tracking system, the handheld tape dispenser may transmit and receive information during dispensing of the tape nodes in real-time or in batches, e.g., at scheduled times. For example, the handheld tape dispenser may transmit identifiers of tape nodes dispensed by the handheld tape dispenser, corresponding assets of the tape nodes dispensed by the handheld tape dispenser, and the like. In another example, the handheld tape dispenser may receive information to be printed by the printing device 214 onto tape nodes during dispensing, such as barcodes, identifiers, tracking numbers, addresses, graphical images, and other tracking information of assets corresponding to the tape nodes. In another example, the handheld tape dispenser may receive location information from gateway or other nodes having known locations or associated with known areas within an environment, e.g., nodes associated with a particular trailer, conveyer belt, or pallet, or nodes associated with freezer units, storage areas, and the like.

In some embodiments, the wireless interface 170 comprises a short range communications interface, e.g., NFC, RFID, Bluetooth LE, Zigbee, or Z-wave, to enable communications between the handheld tape dispenser and the dispensed tape node 182 as they are dispensed or following dispensing. Communications between the handheld tape dispenser 151 and tape nodes may be used for a number of purposes. For example, the handheld tape dispenser may retrieve an identifier of the tape node by initiating a communication connection to the tape node, e.g., receiving a handshake signal comprising an identifier of the tape node. In another example, the handheld tape dispenser comprises a barcode and/or QR code scanner, and may scan a QR code of the tape node to retrieve an identifier of the tape node. In other examples, the handheld tape dispenser may activate tape nodes as they are dispensed by transmitting an instruction for the tape node to enter an active mode. In other examples, the handheld tape dispenser may initiate self-testing of the tape nodes by transmitting an instruction for the tape node to perform one or more self-tests during dispensing or following dispensing, and may receive results of the self-testing from the tape nodes when the self-testing is completed.

In some embodiments, the wireless interface 170 is configured to communicate with one or more other handheld tape dispensers within an environment. Because environments may comprise a plurality of handheld tape dispensers that are simultaneously active, e.g., transmitting and receiving communications and dispensing tape nodes for deployment, it is important to ensure that multiple dispensers do not perform redundant duties, such as, for example, associating tape nodes with a same asset. In some embodiments, the wireless interface 170 of the handheld tape dispenser establishes a communication channel with other active handheld tape dispensers within a threshold distance, e.g., 20 ft., or within a shared area of the environment, e.g., within a room or along a shared conveyer belt, and provides and receives information, in real-time or near real-time, describing tape nodes and associated assets as the tape nodes are dispensed. In other embodiments, the wireless interface 170 of the handheld tape dispenser receives information describing tape nodes being deployed by other tape dispensers in the environment and associated assets from a cloud or server of the wireless tracking system.

In some embodiments, an alignment system is operative to automatically align indicia printed on the front side of the tape with the cutter. In some embodiments, the alignment system includes an imaging device 174, e.g., a camera or optical scanner, that is operable to detect one or more target indicia printed on the top surface of the tape as the tape is being advanced along the tape feed path. Responsive to detection of the one or more target indicia by the imaging device 174, the alignment system is operable to automatically halt advancement of the tape in response to a determination that the printed indicia are aligned with the cutter. In other embodiments, the alignment system is operable to halt the advancement of the tape responsive to a determination that a target number of rotations of one or more of the drive rollers 162 has been reached as determined by, for example, a count of rotary encoder pulses.

Figure 11A:
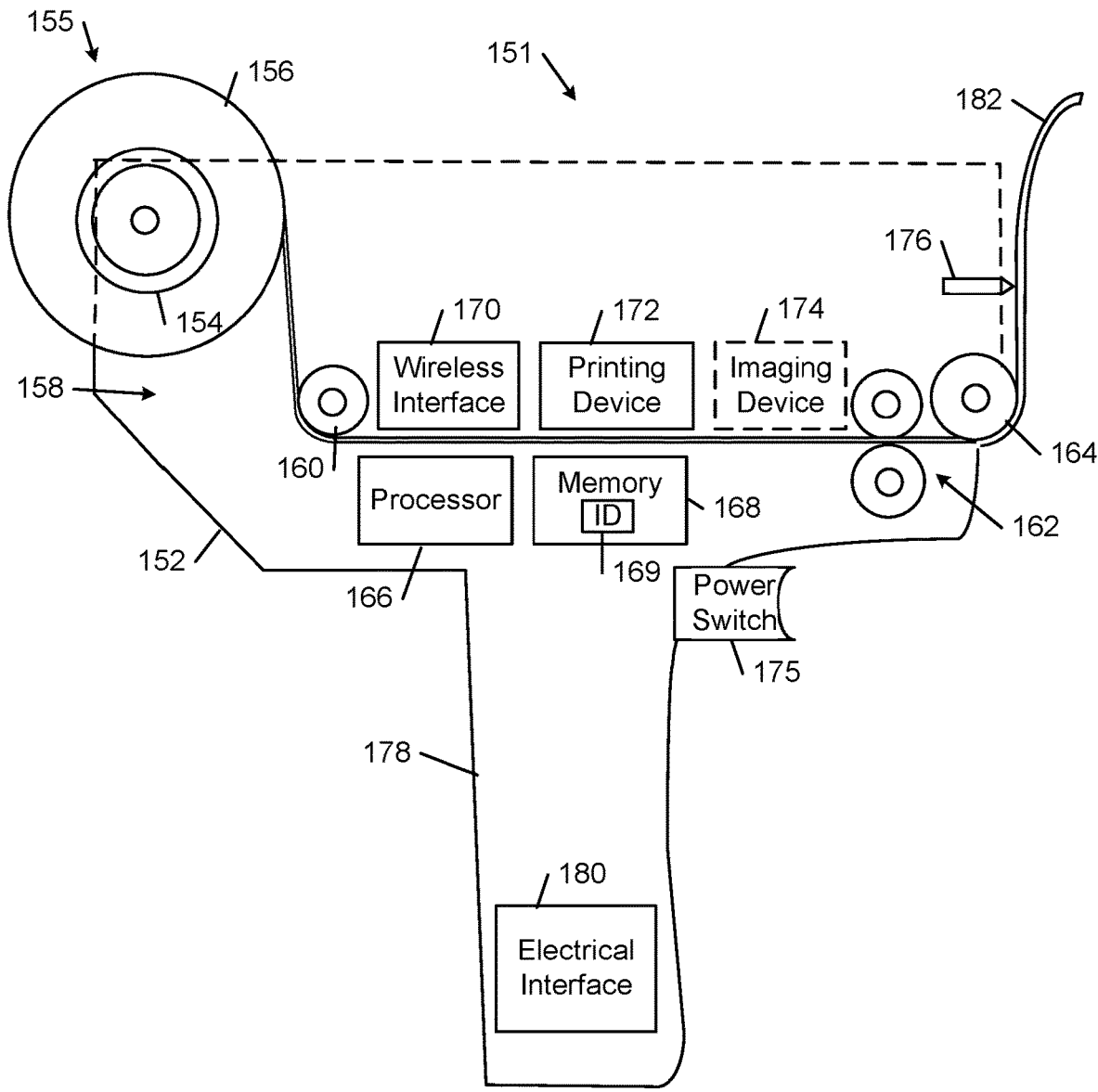
FIG. 11A is a diagrammatic view of an embodiment of a handheld tape dispenser.
Figure 11B:
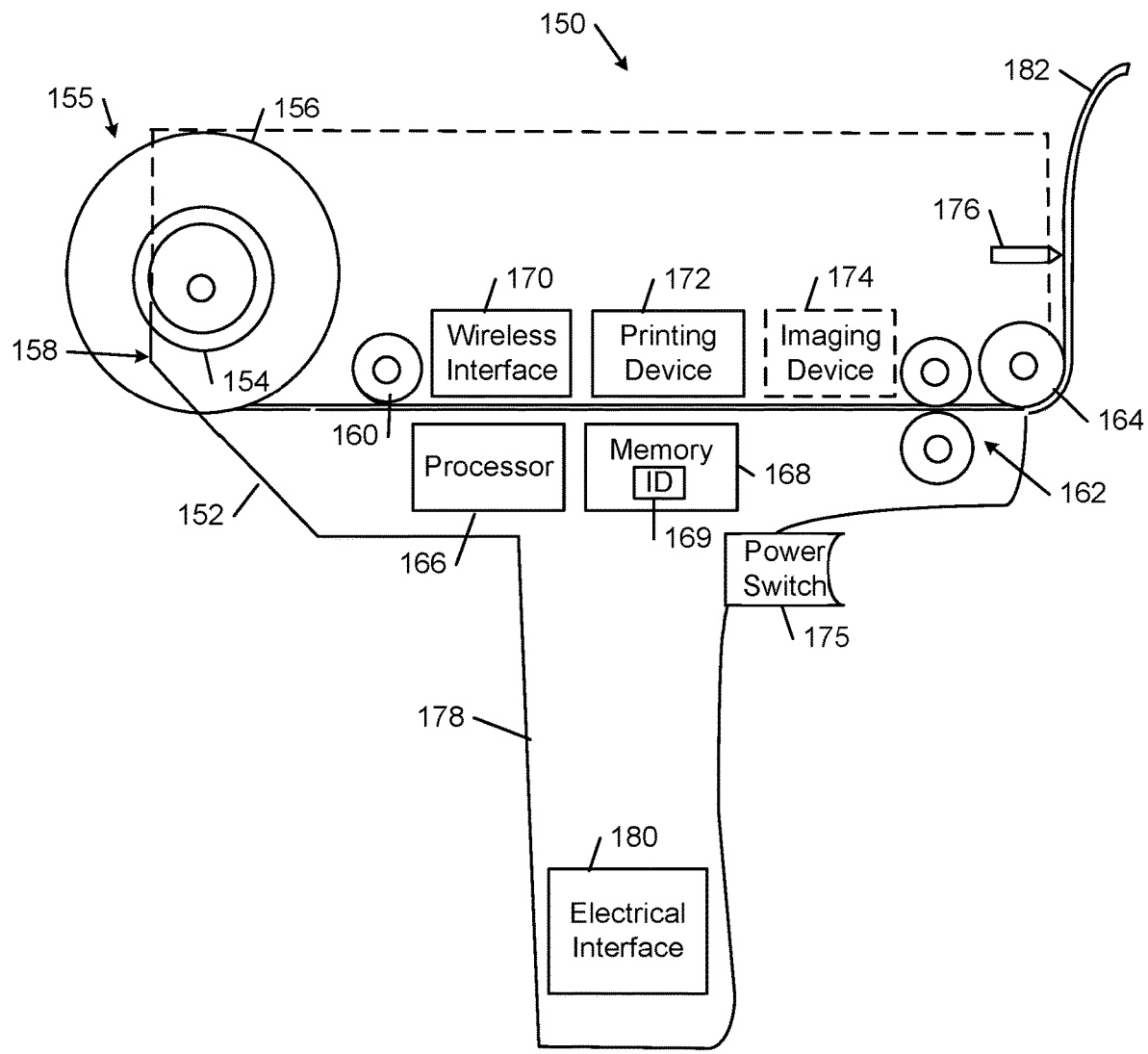
FIG. 11B is a diagrammatic view of an alternate embodiment of the handheld tape dispenser.

FIG. 11B shows a diagrammatic view of an alternate embodiment of the handheld tape dispenser 151. The handheld tape dispenser 151 is substantially similar to the embodiment of the handheld tape dispenser 150 shown in FIG. 11A and includes the same components as the embodiment of the handheld tape dispenser 150, except that the position of the spool fastener 154 and the roll 155 is aligned to prevent excessive bending or flexing of the tape nodes as they pass through the backend roller 160, the drive rollers 162, and the frontend roller 164. In some embodiments, the tape nodes in the roll 155 may have limited flexibility. The handheld tape dispenser 151 is configured to automatically dispense tape nodes without subjecting the tape nodes in the roll 155 to a bending radius that is above a threshold bending radius. The threshold bending radius may correspond to a limit of bending which a tape node may be bent around before damage occurs to one or more components of the tape node.

Figure 11C:
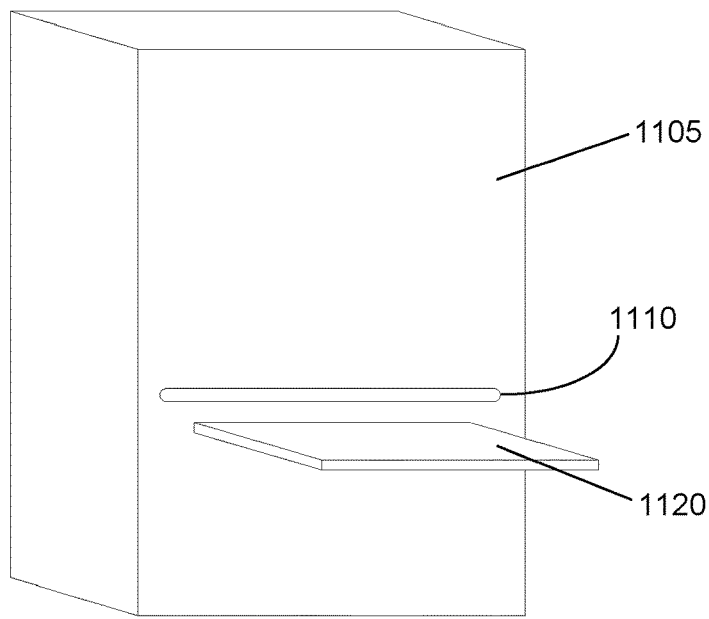
FIG. 11C shows a wireless node dispenser, according to some embodiments.
Figure 11D:
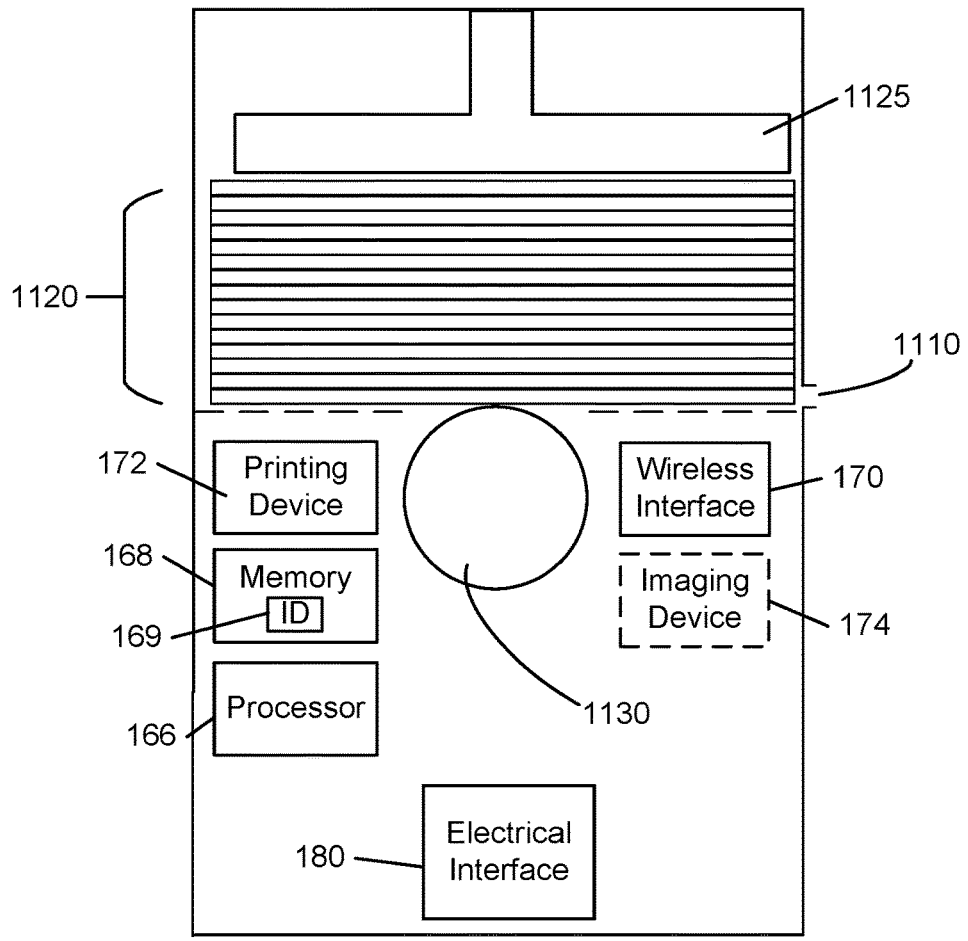
FIG. 11D is a diagrammatic view of the wireless node dispenser, according to some embodiments.

FIG. 11C shows a wireless node dispenser, according to some embodiments. The wireless node dispenser 1105 is configured to store and dispense wireless devices 1120 that are not segments of a contiguous roll, e.g., tape nodes having a card form factor or another stackable, discrete form factor. The wireless node dispenser 1105 dispenses the wireless device 1120 and automatically associates the dispensed wireless device 1120 with an asset or a task assigned to the wireless device 1120, similar to the handheld tape dispenser 151. In the example shown in FIG. 11C, the wireless device 1120 is an embodiment of a tape node and is referred to herein as the tape node 1120. The tape node 1120 includes a releasable backing sheet or layer (e.g., backing sheet 36 or backing sheet 314) that covers the adhesive portion of the tape node 1120, allowing the tape node 1120 to be stacked with other tape nodes without having the tape nodes in the stack stick to each other. In the embodiment of FIGS. 11C-11D, the tape nodes 1120 are rectangular and substantially flat. In other embodiments, the tape nodes may have a different shape, size, and may comprise releasable backing layers, protruding components, and the like. The wireless node dispenser 1105 comprises a slot 1110, from which tape nodes 1120 are individually dispensed, a loader 1125, a roller 1130, and the same components as the embodiment of the handheld tape dispenser 150 described in conjunction with FIG. 11A stored within the frame of the wireless node dispenser 1105.

FIG. 11D is a diagrammatic view of the wireless node dispenser 1105, according to some embodiments. The wireless node dispenser 1105 comprises a stack of tape nodes 1120 loaded into the dispenser via a loader 1125. In some embodiments, the loader 1125 is a mechanical or spring-loaded component of the wireless node dispenser 1105 configured to open such that the stack of tape nodes 1120 into the wireless node dispenser and further configured to apply pressure on the stack of tape nodes to align them with the roller 1130 and the slot 1110 for dispensing. The roller 1130 rotates to dispense tape nodes 1120 through the slot 1110. In some embodiments, the roller 1130 is powered by the electrical interface 180. In other embodiments, the roller 1130 is connected to a handle that may be manually turned to dispense tape nodes 1120 through the slot 1110. The wireless node dispenser 1105 further comprises the same components as the embodiments of FIGS. 11A-11B, including a processor 166, a memory 168 storing an identifier 169, a wireless interface 170, a printing device 172, and an imaging device 174. In some embodiments, the wireless node dispenser 1105 may comprise additional, fewer, or different components than shown in FIG. 11D.

In some embodiments, the tape dispenser includes a component that is configured to separate the releasable backing sheet of the tape node 1120 from the tape node 1120 as it is being dispensed. For example, the component may be a take-up roller system that separates the releasable backing sheet from the tape by a take-up roller. The backing layer may be removed by, for example, the take-up roller separating the releasable backing layer from the tape at an edge of a planar surface, as described in conjunction with FIGS. 12A-12B.

FIGS. 12A-12B show the internal components of a second embodiment of a handheld tape dispenser 200. For the purposes of illustration, other components of the handheld tape dispenser 200, such as the frame or housing components, are omitted so as to avoid obscuring the core functional components of the handheld tape dispenser. In the illustrated embodiment, the handheld tape dispenser 200 comprises an electrical interface 202, a power switch 204, a processor 206, a memory 208, a wireless interface 212, a printing device 214, an optional imaging device 216, and an optional display 1205.

In some embodiments, the memory 208 stores information comprising one or more of: an identifier 210 of the handheld tape node dispenser 200, one or more identifiers of tape nodes being or having been dispensed, one or more identifiers, barcodes, or tracking numbers of assets corresponding to tape nodes being or having been dispensed, and environmental information. Environmental information may include, for example, a building number or ULD number corresponding to a conveyer belt or trailer in which the handheld tape dispenser operates, or may include an identifier of a last interaction of the handheld tape dispenser with a gateway node or other entity of the wireless tracking system having a known location. In some embodiments, the memory 208 may store some information permanently or semi-permanently, e.g., an identifier 210 of the handheld tape node dispenser 200, environmental information, and the like, while other information may be deleted responsive to being transmitted to another entity of the wireless tracking system or responsive to a threshold amount of time passing, e.g., identifiers of dispensed tape nodes and associated assets. For example, in embodiments wherein the handheld tape dispenser 200 transmits information describing dispensed tape nodes and associated assets to a cloud or server of the wireless tracking system in real-time or in near real-time, the memory 208 may overwrite or delete information that has been transmitted. In another example, the memory 208 may overwrite or delete information that has been stored for more than a threshold amount of time, e.g., is more than 24 hours old, is more than a week old, or is more than 1 hour old.

In some embodiments, the optional display 1205 is configured to display information to operators of the handheld tape dispenser 200. The optional display 1205 may be a simple array of LED status indicators (e.g., a green LED and a red LED), according to some embodiments. In other embodiments, the optional display 1205 is a 2-dimensional display and comprises an LCD display, an LED display panel, an OLED display, or some other type of display. The display 1205 may comprise a screen configured to display text or icons, or may comprise one or more LED lights configured to light up responsive to events during deployment of tape nodes. For example, the display 1205 may display one or more of: instructions to operators of the handheld tape dispenser 200 for dispensing tape nodes; unique identifiers of tape nodes during deployment; notifications such as confirmations that tape nodes are successfully activated, that associations between unique identifiers of deployed tape nodes and corresponding assets are stored; parameter and configuration information for activated tape nodes; and the like. In other examples, the display 1205 may provide notifications during auditing or self-testing of deployed tape nodes. In other embodiments, the display may be used to provide other information, or may comprise a different form than discussed herein. The display provides verification and instructions to the operator of the handheld tape dispenser 200. In some cases, the operator may verify that the dispensed tape node has been correctly installed and is functional for a task that is assigned to the dispensed tape node. In further embodiments, the display may provide instructions to the operator to take additional actions after dispensing and installing a tape node. For example, the display may notify the user that the dispensed tape node is malfunctioning or not capable of performing an assigned task. The display may further provide instructions for the user to replace the dispensed tape node with a new tape node.

In other embodiments, the handheld tape dispenser 200 may comprise additional, fewer, or different components, and the components may be arranged or oriented differently than shown in FIGS. 12A-12B. In some embodiments, these components operate and function as described above in conjunction with FIG. 11.

In the embodiment of FIGS. 12A, the adhesive tape is in the form of a strip of labels 218 with respective sets of embedded label node components and respective machine-readable codes 220, e.g., two-dimensional barcodes, QR codes, or the like. The labels 218 are disposed on a release liner 222, which enables the labels to be removed without damaging the machine-readable codes 220 or the components within the labels 218. In some embodiments, the labels 218 are embodiments of a tape node, and are also referred to herein as tape nodes 218. The front end of the release liner 222 is wrapped around a take-up roller 223. In some embodiments, the take-up roller is electrically powered. In other embodiments, the take-up roller 223 is manually powered, e.g., by manually rotating the take-up roller with a crank. In the illustrated embodiment, the strip of labels is dispensed from a roll 224 on a spool fastener 226. The dispensed strip of labels is carried by a support frame 228 with a low-friction surface. In the illustrated embodiment, the support frame 228 has a proximal planar portion 229 that extends from the spool fastener 226 to a curved bend 230 that ends at a terminal edge 232. In some embodiments, the curved bend 230 is greater than ninety degrees and, in preferred embodiments, the curved bend is greater than one hundred twenty degrees.

In the illustrated embodiment, the take-up roller 223 drives the label dispensing process. In particular, the release liner 222 is wrapped around the take-up roller 223 as the take-up roller is rotated by a motor or manual crank (not shown), which advances the strip of labels 228 around the bend 230 toward the terminal edge 232. As also shown in FIG. 10B, the loop circuit 282 includes the resistor $R_2$, which maintains a low voltage on the switch node that is below the threshold needed to open the switch 296 and turn on the label 218.

In some embodiments, the handheld tape dispenser is configured to perform one or more actions to activate tape nodes during or following dispensing. Prior to activation, a tape node may be powered off or may be in a sleep, hibernation, or other low-power state wherein one or more functionalities and/or systems are not active or are selectively active. In some embodiments, tape nodes are activated responsive to being powered on, e.g., completing a circuit to deliver power from an electrical power source of the tape node to the processor and other systems of the tape node. In other embodiments, tape nodes are activated responsive to receiving, via an active or selectively active communications system, an instruction to activate transmitted from the handheld tape dispenser 200 by its wireless interface 212. During activation, tape nodes may perform a number of actions, such as, for example, one or more of: Connecting to a server or cloud of a wireless tracking system; connecting to a gateway node or other entity in an environment of the wireless tracking system; being configured, by an entity of the wireless tracking system or a client device, with one or more parameters, functions, and instructions; performing an audit or self-test on one or more parameters and functions of the tape node; authenticating a received instruction to activate; and the like.

The activation of the tape node 218 may include initiation steps, such as configuring the tape node 218, wirelessly connecting with one or more nodes of the wireless tracking system, wirelessly connecting to a server of the wireless tracking system, other steps taken by the tape node 218 at the time of activation, or some combination thereof. The configuring of the tape node 218 may include setting or adjusting parameters stored on the wireless tape node used for performing functions and executing software, configuring hardware settings of the wireless tape node, other configuration for the operation of the tape node, or some combination thereof. According to some embodiments, the handheld tape dispenser 200 assists or participates in the initiation steps for the tape node 218. The handheld tape dispenser may wirelessly transmit instructions or set parameters for the configuration of the tape node 218. In some embodiments, the handheld tape dispenser 200 receives the configuration settings for the tape node 218 from another node or server of the wireless tracking system, and relays the configuration settings to the tape node 218.

In some embodiments tape nodes are activated by removing a releasable backing layer such as the release liner 222 from the tape, wherein removal of the backing layer activates a wake circuit that allows power to be delivered from an electrical power source to the processor, wireless communications systems, and other electrical components of the tape node. Referring to FIG. 12B, activation may be performed by the handheld tape dispenser. As the take-up roller 223 advances the label 218 past the terminal edge 232 of the support frame 228, the release layer 222 is pulled away from the label 218, such that the loop circuit 282 disposed on the release liner 222 disconnects from the associated label 218 and thereby forms an open circuit across the loop 282 that pulls up the voltage on the switch node above the threshold level to close the switch 296 and turn on the tape node segment 218. In the illustrated embodiment, the release liner 222 forms a sharp angle at the distal edge of the support frame 228. At this point, the user can manually dispense the label 218 by removing the label 218 from the release liner 222 and applying the label to a target surface, e.g., a surface of an asset being prepared for transportation, a surface of an infrastructure element or an environmental element, or the like. In some embodiments wherein the target surface comprises an electrically conductive region 316, as described in conjunction with FIG. 10C, the tape nodes are activated by removing the backing layer and adhering or applying the exposed adhesive to the surface including the electrically conductive region. In other embodiments, the target surface does not comprise an electrically conductive region, and the tape nodes are activated responsive to removal of the backing layer, e.g., without requiring application to the target surface.

In other embodiments as described previously in conjunction with FIG. 6, tape nodes are activated by cutting the tape such that an open circuit is created in an electrical path of the tape node, allowing power to be delivered from an electrical power source to the processor, wireless communications systems, and other electrical components of the tape node. As discussed in conjunction with FIG. 11, the handheld tape dispenser comprises a tape cutter 176 used to cut segments of the wireless tape from the tape roll manually or via a guillotine blade. The tape cutter 176 is configured to cut the segments of the wireless tape from the tape roll so as to activate the tape nodes.

In other embodiments, other methods of activation may be used. For example, in some embodiments, tape nodes may be activated by the handheld tape dispenser via the wireless interface 212 communicating an instruction to the tape nodes via a short-range communications system to tape nodes as they are dispensed. For example, tape nodes comprising an NFC module may receive, from the handheld tape dispenser, an NFC wake signal and activate responsive to receiving the NFC wake signal. In another example, handheld tape dispensers may comprise an RFID reader configured to read an RFID tag of dispensed tape nodes and to establish, based on the RFID tag of the tape node, a communication connection to activate the dispensed tape node. In other embodiments, tape nodes may alternately be activated by shaking or performing another mechanical action to the tape node; exposing a portion or a whole of the tape node to a light source; and the like.

FIG. 13 is a flow diagram of a method for operation of a handheld tape dispenser, according to some embodiments. A handheld tape dispenser receives 1305 a roll of tape onto a spool fastener on a frame of the handheld tape dispenser. In some embodiments, the frame of the handheld tape dispenser additionally comprises a handle extending from the frame. The roll of tape comprises a plurality of segments of a flexible laminated structure, and each segment of the plurality of segments comprises one or more electronic components. For example, the one or more electronic components comprises one or more of: an antenna, a wireless communications system, one or more processors, an energy source, at least one non-transitory processor-readable medium comprising instructions which, when executed by the one or more processors, configures the one or more processors to perform operations described previously in conjunction with, for example, FIGS. 2-10B. In an example, the instructions configure the one or more processors to communicate wirelessly with a wireless tracking system 400.

The handheld tape dispenser drives 1310 a set of drive rollers on a tape feed path to draw tape from the roll of tape along the tape field path. In some embodiments, the handheld tape dispenser comprises a printing device positioned adjacent to the tape feed path. The handheld tape dispenser prints 1315, by the printing device, indicia onto at least a front side of the tape while the tape is drawn along the tape feed path adjacent to the printing device. For example, the printing device may print one or more of: text, illustrations, two-dimensional barcodes or QR codes, and the like.

The handheld tape dispenser removes 1320 at least a portion of the tape on the tape feed path, such that the removed portion of the tape may be applied to a surface for use by the wireless tracking system. For example, the removed portion of the tape may be adhered to an asset preparing for transportation, or may be adhered to a surface of an environmental or infrastructure element of the wireless tracking system.

In some embodiments, the handheld tape dispenser removes the portion of the tape by cutting the tape transversely across the tape field path. Responsive to the tape being cut, a wake circuit in the portion of the tape is activated to deliver power from an electrical power source to a respective processor and a respective wireless communications system of the portion of tape. In some examples, as described in conjunction with FIGS. 10A-10B and 11, the wake circuit is activated responsive to the cut by the handheld tape dispenser creating an open circuit in an electrical path of the wake circuit of the portion of tape. In other embodiments, the handheld tape dispenser removes the portion of the tape by removing a releasable backing layer from the tape by a take-up roller. Responsive to the backing layer being removed, a wake circuit in the portion of the tape is activated to deliver power from an electrical power source to a respective processor and a respective wireless communications system of the portion of tape. In some examples, the wake circuit is activated responsive to removal of the backing layer creating an open circuit in an electrical path of the wake circuit of the portion of tape. The backing layer may be removed by, for example, the take-up roller separating the releasable backing layer from the tape at an edge of a planar surface, as described in conjunction with FIGS. 12A-12B. In other embodiments, the handheld tape dispenser may remove the portion of the tape responsive to a manual input, e.g., the application of force by a user of the wireless tracking system to execute a cut by a serrated edge of the cutter.

In the embodiment of FIG. 13, the step is performed by a handheld tape dispenser of a wireless tracking system 400. In other embodiments, one or more of the steps may be performed by another entity. In other embodiments, the method may comprise additional, fewer, or different steps than those described herein, and the steps may be performed in a different order.

Figure 14:
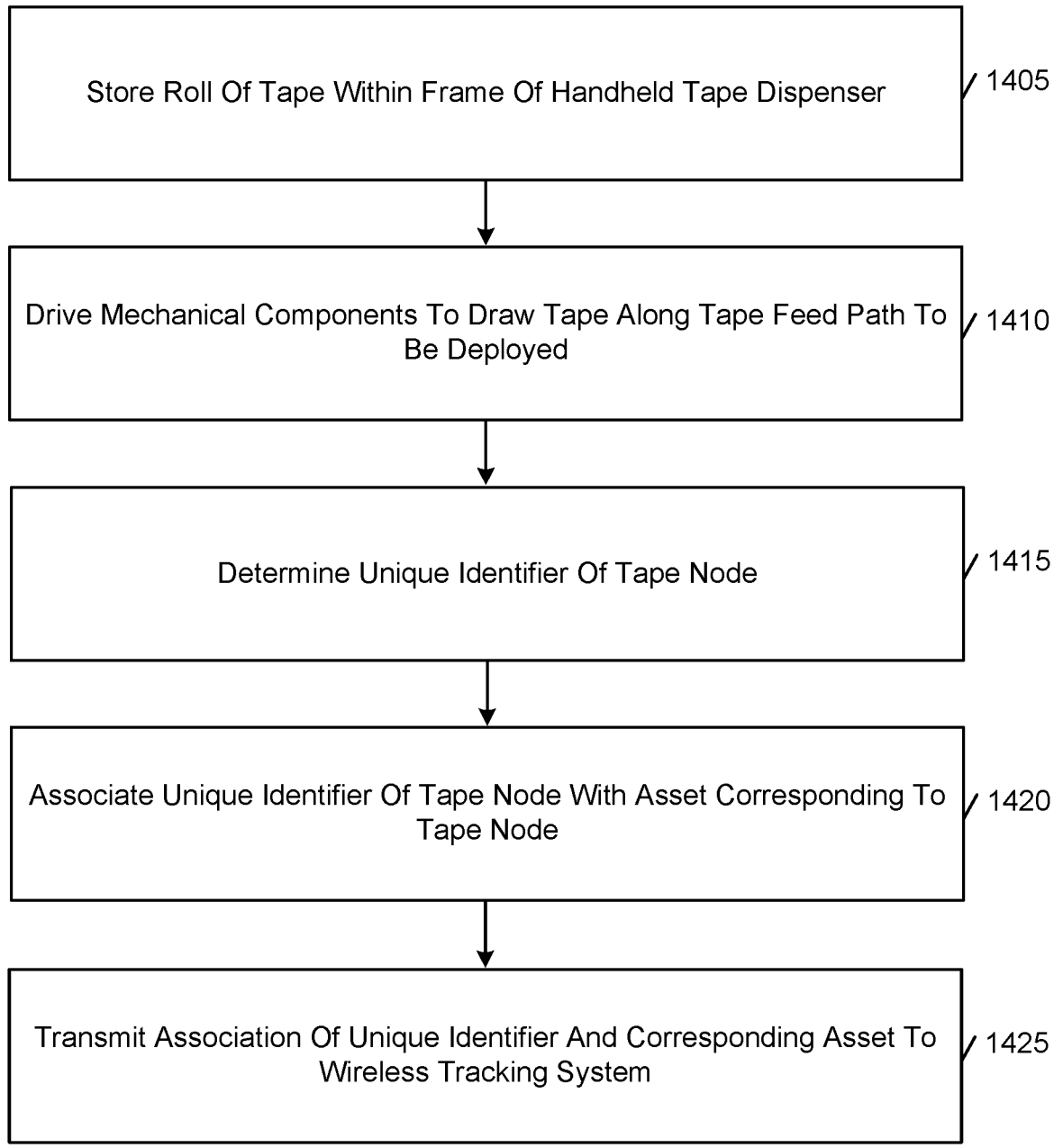
FIG. 14 is a flow diagram of a method for dispensing and associating tape nodes with assets in an environment, according to some embodiments.

FIG. 14 is a flow diagram of a method for dispensing and associating tape nodes with assets in an environment, according to some embodiments. A handheld tape dispenser stores 1405 a roll of tape within a frame of the wireless tape dispenser. The roll of tape comprises a plurality of segments of tape, each segment comprising one or more electronic components. The handheld tape dispenser drives 1410 a set of mechanical components to draw tape from the roll of tape along a tape feed path. The driving results in a tape node being removed from the roll of tape for deployment. In some embodiments, the handheld tape dispenser is configured as described in conjunction with FIG. 11, having a frame and a spool fastener onto which the roll of tape may be fixed. In some embodiments, the roll of tape comprises a plurality of tape nodes as described in conjunction with FIGS. 10A-10B. Removing the tape node from the roll of tape for deployment may, in some embodiments, be performed manually, e.g., by an operator or user tearing a segment of tape or removing a segment of tape from a releasable backing layer, or may be performed automatically by the handheld tape dispenser, e.g., by a cutter of the handheld tape dispenser cutting a segment of tape from the roll of tape or removing a segment of tape from a releasable backing layer. In other examples, other methods of removing the tape node from the roll of tape may be used.

The handheld tape dispenser determines 1415 a unique identifier of the tape node. In some embodiments, the handheld tape dispenser determines the unique identifier of the tape node by scanning, with a barcode or QR code scanner component of the handheld tape dispenser, a QR code printed on the tape node. For example, the QR code may be scanned as the tape node is dispensed along the tape feed path within the frame of the handheld tape dispenser. In another example, the QR code may be scanned after the tape node is removed from the roll of tape, e.g., after it is adhered or attached to an asset or otherwise deployed within an environment. In some embodiments, the handheld tape dispenser determines the unique identifier of the tape node by establishing a communication connection with the tape node during or following deployment. The handheld tape dispenser may use RSSI filtering to isolate a signal corresponding to the tape node (e.g., a nearest signal to the handheld tape dispenser), or may use other methods to establish a connection to the tape node. The handheld tape dispenser receives the unique identifier of the tape node via the communication connection.

The handheld tape dispenser associates 1420 the unique identifier of the tape node with an asset corresponding to the tape node. In some embodiments, the handheld tape dispenser receives information describing the asset corresponding to the tape node by an entity, e.g., a cloud or server, of the wireless tracking system. The information may comprise, for example, a tracking number, barcode information, tracking information, and the like. In other embodiments, the handheld tape dispenser receives information describing the asset by scanning, by a barcode or QR code scanner component of the handheld tape dispenser, a barcode of the asset corresponding to the tape node. In some embodiments, the handheld tape dispenser stores the unique identifier of the tape node in association with the tracking number, barcode, or other identifying information of the asset in a local memory of the handheld tape dispenser.

The handheld tape dispenser transmits 1425 the unique identifier of the tape node and the corresponding asset to the wireless tracking system. In some embodiments, the handheld tape dispenser establishes a communication connection to an entity, such as a cloud or server, of the wireless tracking system when active and transmits the information in real-time or in near real-time. In other embodiments, the handheld tape dispenser transmits scheduled communications to the entity of the wireless tracking system, such that it locally stores and transmits batches of information at, for example, one hour intervals, ten minute intervals, or one day intervals.

In some embodiments, the handheld tape dispenser is further configured to activate the tape node upon deployment. In some embodiments, activating the tape node comprises removing a releasable backing layer from the tape. As discussed in conjunction with FIGS. 11A-11B, removal of the releasable backing layer activates a wake circuit that delivers power from an electrical power source of the tape node to a respective processor and a respective wireless communications system of the tape node, causing the tape node to turn on. In other embodiments, activating the tape node comprises cutting the tape node from the roll of tape, wherein the cut is performed so as to create an open circuit in an electrical path of a wake circuit that delivers power from an electrical power source of the tape node to a respective processor and a respective wireless communications system of the tape node. In other embodiments, activating the tape node may comprise of one or more of: transmitting a communication with the tape node via NFC; reading an RFID tag associated with the tape node; shaking or performing another mechanical action to the tape node; exposing a portion or a whole of the tape node to a light source; and the like, as described in conjunction with FIG. 12A.

The wireless tracking system receives the transmitted unique identifier and the corresponding asset and stores the unique identifier, the corresponding asset, and the association between the unique identifier and the corresponding asset in a database of the wireless tracking system. The corresponding asset may be transmitted, received, and stored in the form of an identifier for the asset, according to some embodiments. For example, the asset may be identified by a tracking number for a delivery that corresponds to the asset. By using the method of FIG. 14, the wireless tracking system may automatically dispense tape nodes for use with an asset and determine tape node identifiers associated with the asset with minimal input from an operator of the handheld tape node. The system then stores the association, allowing for users of the wireless tracking system to track the asset via the tape node and its identifier. This allows for efficient and simplified deployment of tape nodes and wireless devices for tracking assets.

Because handheld tape dispensers may operate in environments comprising a plurality of tape nodes, it is valuable for handheld tape dispensers to accurately isolate communications between the handheld tape dispenser and a dispensed tape node for the purpose of actions such as activating tape nodes, initiating audits of tape nodes, and associating tape nodes with assets in the environment. Tape nodes in the environment may be activated, e.g., tape nodes having been deployed in the environment, or may be inactive or in a sleep mode, e.g., tape nodes waiting for deployment. In some embodiments, handheld tape dispensers are configured to apply RSSI filtering to isolate a signal corresponding to the tape node from other signals in the environment of the tape nodes. The RSSI filtering may, for example, isolate a signal corresponding to a nearest tape node in the environment. In other embodiments, handheld tape nodes may comprise a barcode or QR code scanning module configured to scan a QR code or barcode of a tape node. The barcode or QR code scanning module may be configured to scan the QR code or barcode of the tape node during dispensing, e.g., the scanning module is oriented to read tape nodes as the tape is drawn along the tape feed path, or may be configure to scan the QR code or barcode of the tape node following dispensing. The handheld tape dispenser identifies a unique identifier of the tape node based on the scanned QR code or barcode and isolates communications between the handheld tape dispenser and the tape node having the unique identifier. In other embodiments, other methods for isolating communications in environments having a plurality of activated tape nodes may be used.

In some embodiments, the handheld tape dispenser is further configured to initiate auditing or self-testing to be performed by the tape node upon deployment. As described in conjunction with FIG. 11, the handheld tape dispenser may transmit an instruction to tape nodes upon deployment to initiate an audit comprising one or more self-tests, or to receive information describing, for example, battery or voltage levels of the tape node. Results of the one or more self-tests and the received information may be used by the handheld tape dispenser to ensure that tape nodes functioning correctly and able to perform tasks prior to deployment, such as, for example, communicating via certain communications systems, having adequate battery charge for to track a corresponding asset, and the like. In some embodiments, the handheld tape dispenser may participate in the audit, e.g., transmitting or receiving communications via particular communications channels with the tape node. In some embodiments, the handheld tape dispenser receives information describing threshold numbers of passed self-tests, threshold battery or voltage levels, and the like from the wireless tracking system.

The handheld tape dispenser transmits a notification to a user of the handheld tape dispenser indicating whether the tape node passes or fails the audit. In some embodiments, the handheld tape dispenser comprises a display as described in conjunction with FIGS. 12A-12B, wherein the display is configured to provide a notification indicating whether the tape node passes or fails the audit. The display may be, for example, an LED configured to light up based on the audit results, or may be a screen displaying text message or icon to convey the notification. In other embodiments, the handheld tape dispenser transmits the notification to another entity of the wireless tracking system, e.g., to a cloud or server of the wireless tracking system, or to a client device of an operator of the handheld tape dispenser, e.g., via text message, SMS, e-mail, or phone call. For example, in cases wherein the tape node passes the audit, the notification may comprise a green LED lighting up, a check symbol or text displayed on a display of the handheld tape dispenser, a notification to a client device or server confirming that the audit has been passed, or the like. In another example, in cases wherein the tape node fails the audit, the notification may comprise a red LED lighting up, an "X" symbol or text displayed on a display of the handheld tape dispenser, or a notification to a client device or server that the audit has failed. The notification may additionally or instead provide instructions to an operator of the handheld tape dispenser to perform actions such as discarding a tape node, re-initiating a process of dispensing and applying a tape node to the asset, flagging the tape node for refurbishment, recycling, or other actions, and modifying one or more parameters of the tape node. Additional details regarding self-testing or auditing of tape nodes for deployment are described in U.S. Provisional Patent Application No. 63/150,982, filed Feb. 18, 2021.

In the embodiment of FIG. 14, the step is performed by a handheld tape dispenser of a wireless tracking system 400. In other embodiments, one or more of the steps may be performed by another entity. In other embodiments, the method may comprise additional, fewer, or different steps than those described herein, and the steps may be performed in a different order.

Computer Apparatus

Figure 15:
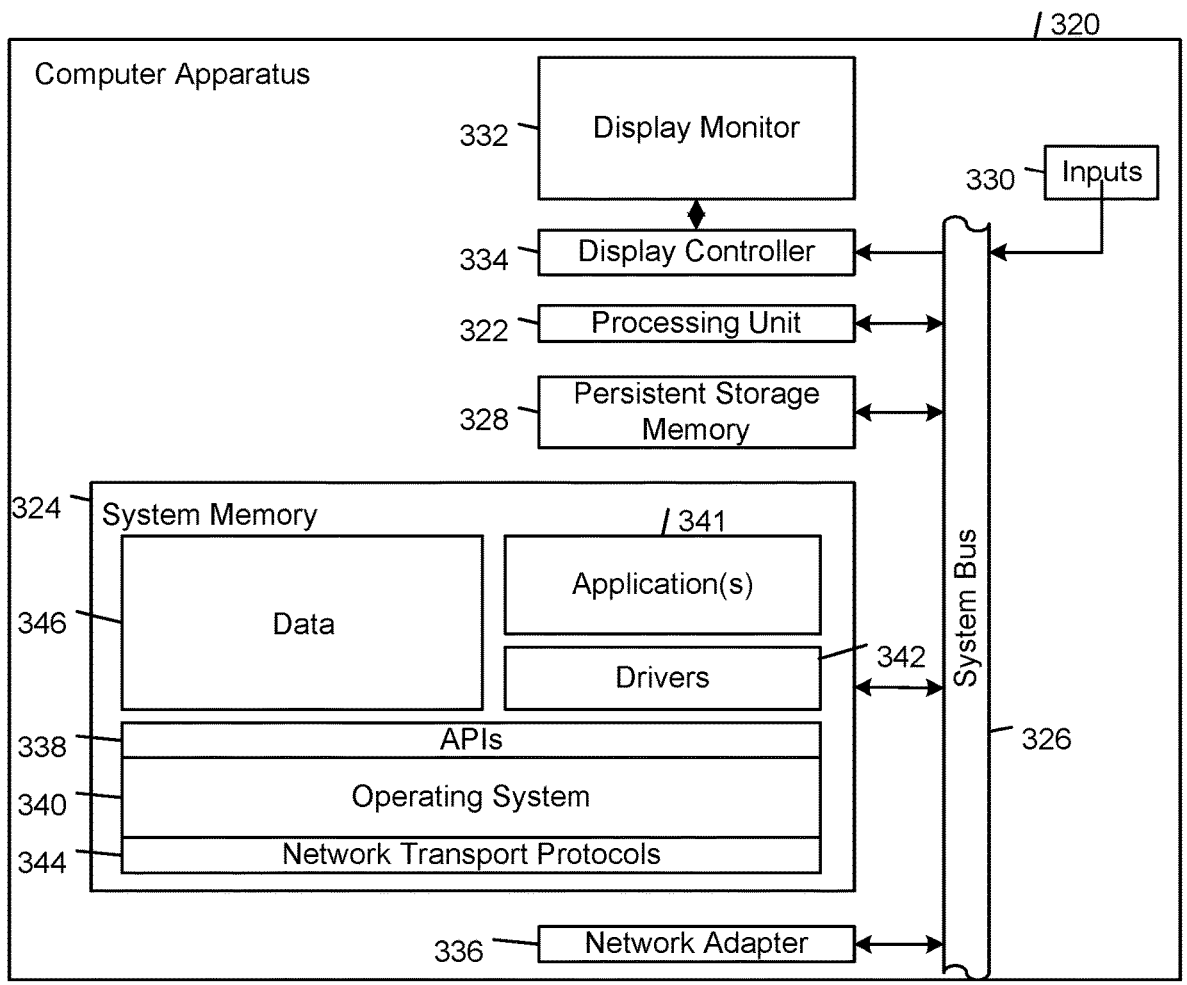
FIG. 15 is a block diagram of an example computer apparatus.

FIG. 15 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random-access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g., one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Benefits

The handheld tape dispenser and method described herein enable users and operators in IoT environments to dispense tracking devices, such as tape nodes, quickly and accurately. Because IoT environments may comprise large numbers of assets being transported, manually applying tracking devices to assets is time-consuming. Further, because tracking devices must be associated correctly to corresponding assets to provide accurate information about transportation of the assets, mistakes during deployment of tracking devices may heavily impact downstream processes. The handheld tape dispenser disclosed herein automatically dispenses tracking devices for deployment, including mechanisms for determining identifiers of the tracking devices and automatically associating the determined identifiers with corresponding assets, activating tracking devices that may be powered off or in a sleep or inactive mode, initiating audits or other self-tests of the tracking devices following deployment, printing barcodes, labels, or tracking information on the tracking device, and providing notifications to operators during the deployment process. By automating these processes, the handheld tape dispenser significantly reduces workload, time, and likelihood of human error during deployment.

What is claimed is:

1. A method comprising:
    storing, by a handheld tape dispenser, a roll of tape within a frame of the handheld tape dispenser, wherein the roll of tape comprises a plurality of segments of tape, each segment corresponding to a tape node, and wherein each segment comprises one or more electronic components, each tape node in the roll of tape storing a unique identifier on a memory of the respective tape node, the unique identifier preassigned thereto;
    driving, by the handheld tape dispenser, a set of mechanical components of the handheld tape dispenser to draw tape from the roll of tape along a tape feed path, wherein the driving results in a segment of tape being removed from the roll of tape by the handheld tape dispenser for deployment;
    determining, by the handheld tape dispenser, the unique identifier of a tape node corresponding to the removed segment of tape;
    associating, by the handheld tape dispenser, the unique identifier of the tape node with an asset corresponding to the tape node;
    transmitting, by the handheld tape dispenser, the determined unique identifier, an identifier for the asset, and the association of the unique identifier of the tape node and the corresponding asset to a wireless tracking system, wherein the wireless tracking system stores the unique identifier, the identifier for the corresponding asset, and the association in a database.

2. The method of claim 1, wherein determining a unique identifier of the tape node comprises scanning, by an imaging module of the handheld tape dispenser, a QR code with the unique identifier encoded in the QR code printed on the tape node.

3. The method of claim 1, wherein determining a unique identifier of the tape node comprises receiving, by the handheld tape dispenser, a communication comprising the unique identifier of the tape node.

4. The method of claim 3, wherein receiving a communication comprises applying RSSI filtering to isolate a signal corresponding to the tape node from other signals in an environment of the handheld tape dispenser.

5. The method of claim 1, wherein associating the unique identifier of the tape node with an asset corresponding to the tape node comprises:
    receiving, by a handheld tape dispenser, information describing the asset corresponding to the tape node by an entity of the wireless tracking system, the information comprising a tracking number of the asset; and
    storing, by the handheld tape dispenser, the unique identifier of the tape node in association with the tracking number of the asset.

6. The method of claim 5, wherein the information describing the asset is received from a server or cloud of the wireless tracking system.

7. The method of claim 1, further comprising printing, by a printing device of the handheld tape dispenser, indicia onto at least a front side of the tape while the tape is drawn along the tape feed path.

8. The method of claim 7, wherein the indicia is one or more of: a barcode, a tracking device, and tracking information of the asset corresponding to the tape node.

9. The method of claim 1, further comprising activating, by the handheld tape dispenser, the tape node upon deployment.

10. The method of claim 9, wherein activating the tape node comprises removing a releasable backing layer from the tape, wherein removal of the backing layer activates a wake circuit that delivers power from an electrical power source to a respective processor and a respective wireless communications system of the tape node.

11. The method of claim 9, wherein activating the tape node comprises cutting the tape transversely across the tape feed path, wherein cutting the tape creates an open circuit in an electrical path of a wake circuit that delivers power from an electrical power source to a respective processor and a respective wireless communications system of the tape node.

12. The method of claim 9, wherein activating the tape node comprises communicating, by the handheld tape dispenser, with the tape node via an NFC communications system.

13. The method of claim 9, wherein activating the tape node comprises communicating, by the handheld tape dispenser, with the tape node via an RFID tag associated with the tape node.

14. The method of claim 1, further comprising:
initiating, by the handheld tape dispenser, an audit of the tape node, the audit comprising one or more tests performed by the tape node; and
receiving, by the handheld tape dispenser, results of the audit by the tape node.

15. The method of claim 14, further comprising
determining, by the handheld tape dispenser based on the results of the audit, that the tape node passes the audit; and
transmitting, by the handheld tape dispenser, a notification to an operator of the handheld tape dispenser that the audit is successfully completed.

16. The method of claim 14, further comprising
determining, by the handheld tape dispenser based on the results of the audit, that the tape node fails the audit; and
transmitting, by the handheld tape dispenser, a notification to an operator of the handheld tape dispenser to perform one or more of: discarding the tape node; using the handheld tape dispenser to repeat the process of dispensing, associating, and initiating a second tape node; flagging the tape node for refurbishment or recycling; and modifying one or more parameters of the tape node.

17. A handheld tape dispenser comprising:
a frame comprising a set of mechanical components, the frame and set of mechanical components configured to perform operations comprising:
storing a roll of tape within the frame of the handheld tape dispenser, wherein the roll of tape comprises a plurality of segments of tape, each segment corresponding to a tape node, and wherein each segment comprises one or more electronic components, each tape node in the roll of tape storing a unique identifier on a memory of the respective tape node, the unique identifier preassigned thereto prior to deployment;
driving the set of mechanical components of the handheld tape dispenser to draw tape from the roll of tape along a tape feed path, wherein the driving results in a segment of tape being removed from the roll of tape by the handheld tape dispenser for deployment;
and a non-transitory computer-readable storage medium storing executable instructions that, when executed by a processor, cause the processor to perform steps comprising:
determining the unique identifier of a tape node corresponding to the removed segment of tape;
associating the unique identifier of the tape node with an asset corresponding to the tape node; and
transmitting the unique identifier, an identifier for the corresponding asset, and the association of the unique identifier of the tape node and the corresponding asset to a wireless tracking system.

18. The handheld tape dispenser of claim 17, wherein the wireless tracking system stores the determined unique identifier, the identifier for the corresponding asset, and the association in a database of the wireless tracking system.

19. The handheld tape dispenser of claim 17, wherein determining a unique identifier of the tape node comprises receiving, by the handheld tape dispenser, a communication comprising the unique identifier of the tape node.

20. The handheld tape dispenser of claim 17, wherein associating the unique identifier of the tape node with an asset corresponding to the tape node comprises:
receiving, by a handheld tape dispenser, information describing the asset corresponding to the tape node by an entity of the wireless tracking system, the information comprising a tracking number of the asset; and
storing, by the handheld tape dispenser, the unique identifier of the tape node in association with the tracking number of the asset.

* * * * *